US008181935B2

(12) United States Patent
Haberhauffe et al.

(10) Patent No.: US 8,181,935 B2
(45) Date of Patent: May 22, 2012

(54) SLIDING VALVE

(75) Inventors: Ingo Haberhauffe, Gelsenkirchen-Horst (DE); Wolfgang Plum, Kreuzau-Winden (DE)

(73) Assignee: Z & J Technologies GmbH (DE)

( * ) Notice: Subject to any disclaimer, the term of this patent is extended or adjusted under 35 U.S.C. 154(b) by 695 days.

(21) Appl. No.: 12/278,513

(22) PCT Filed: Feb. 1, 2007

(86) PCT No.: PCT/EP2007/000881
§ 371 (c)(1),
(2), (4) Date: Apr. 1, 2009

(87) PCT Pub. No.: WO2007/090565
PCT Pub. Date: Aug. 16, 2007

(65) Prior Publication Data
US 2009/0267012 A1    Oct. 29, 2009

(30) Foreign Application Priority Data

Feb. 6, 2006   (DE) .................. 10 2006 005 309
Jun. 21, 2006  (DE) .................. 10 2006 028 508
Aug. 9, 2006   (DE) .................. 10 2006 037 290

(51) Int. Cl.
*F16K 3/00* (2006.01)
(52) U.S. Cl. .................. 251/326; 251/193; 251/118
(58) Field of Classification Search ............ 251/118, 251/193, 203, 326, 328
See application file for complete search history.

(56) References Cited

U.S. PATENT DOCUMENTS

| 2,787,438 | A | * | 4/1957 | Bauer ........................ 251/326 |
| 3,701,359 | A | * | 10/1972 | Worley et al. ............... 137/375 |
| 3,964,507 | A | * | 6/1976 | Jandrasi et al. ............. 137/375 |
| 3,976,094 | A |   | 8/1976 | Jandrasi et al. |
| 4,378,817 | A | * | 4/1983 | Houston ................. 137/315.31 |
| 4,458,879 | A |   | 7/1984 | Jandrasi |
| 4,512,363 | A | * | 4/1985 | Jandrasi et al. ............. 137/375 |

(Continued)

FOREIGN PATENT DOCUMENTS

DE          720599          5/1942

(Continued)

OTHER PUBLICATIONS

Extended European Search Report issued in the corresponding (Divisional) EP App. No. 10178935.2.

*Primary Examiner* — John Fristoe, Jr.
(74) *Attorney, Agent, or Firm* — Alston & Bird LLP

(57) ABSTRACT

The invention relates to a slide valve, especially for controlling a flow of catalyst or like high-temperature media, having a pipe portion (10) and, arranged therein, a restrictor (11) which has an inlet opening and an outlet opening (12a, 12b) through which flow takes place during operation, and having a slide plate (13) which co-operates with the outlet opening (12b) to control the flow of catalyst and which is movable into an open position and a closed position I, II, the slide plate (13) being mounted so as to be displaceable by means of guide elements (14, 15) arranged on the pipe and on the plate, which guide elements are in engagement with one another. The invention is distinguished by the fact that the pipe-associated guide elements (14) are arranged before the outlet opening (12b) in the direction of flow.

29 Claims, 24 Drawing Sheets

U.S. PATENT DOCUMENTS 4,685,611 A * 8/1987 Scobie et al. .................. 251/306
6,050,288 A * 4/2000 Junier ...................... 137/315.27
6,354,324 B1 * 3/2002 Junier ...................... 137/315.27

FOREIGN PATENT DOCUMENTS

| | | |
|---|---|---|
| DE | 1031596 | 6/1958 |
| JP | 8 145200 A | 6/1996 |
| JP | 10 019142 A | 1/1998 |
| JP | 10 184936 A | 7/1998 |
| JP | 11 002340 A | 1/1999 |
| JP | 11 013900 A | 1/1999 |
| JP | 2000 035140 A | 2/2000 |

* cited by examiner

Open position I

SLIDING VALVE

The invention relates to a slide valve having the features of the preamble of claim 1.

Slide valves of this kind are customarily used in FCC (Fluidized Catalytic Cracking) units and are used for controlling the output of the unit, the flow of catalyst (alumina, $Al_2O_3$) being adjusted by means of appropriate open or closed positions of the slide valve.

An example of such a slide valve used in the industry is shown in the left-hand partwise section in FIG. 14. That slide valve has a pipe portion A, in which there is arranged a restrictor B having a restrictor aperture C through which a flow of catalyst passes at high speed (10 m/sec) at temperatures of about 720° C. when the unit is in operation. The restrictor aperture is closed by a slide plate D, as shown in FIG. 14, which is mounted to as to be movable transversely with respect to the direction of flow. For opening the slide valve, the slide plate D is moved out of the closed position shown in FIG. 14 into an open position, so that the restrictor aperture C is partly or completely unblocked.

For displacing the slide plate D there are provided pipe-associated guide rails E which are mounted laterally of the restrictor aperture C. Those pipe-associated guide rails E are in engagement with complementary guide rails provided on the slide plate D. The pipe-associated guide rails E are so arranged that they project into the flow cross-section of the pipe portion A. The pipe-associated guide rails E projecting into the flow cross-section of the pipe portion A are exposed to the flow of media passing through the restrictor aperture C when the slide plate D has been brought into the open position. As a result of its high speed and high temperature, the flow of catalyst has an extremely abrasive action. That abrasive action has the result that serious damage is caused to the pipe-associated guide rails E in the region of the restrictor aperture C as a result of the turbulence of the flow of catalyst. Such guide rails E therefore usually need to be replaced after an operating period of three years.

DE 720 599 discloses a plate slide valve for shutting off gas lines, especially furnace gas lines in blast furnace plants. The patent specification is concerned particularly with the problem of the sealing of the plate slide valve. For that purpose, the plate slide valve has a slide plate which is formed from two parallel plates between which there are arranged two dimensionally-resilient hollow sealing rings. Those hollow sealing rings are connected to pressure lines and can be acted upon by pressure, so that the two plane-parallel plates of the slide plate are pressed apart from one another. As a result, the sealing of the plate slide valve is improved. The patent specification does not indicate how the lateral guide means of the slide plate is constructed.

DE 1 031 596 describes a cooled hot gas slide valve for hot and dirt-laden operating materials. That patent specification too is primarily concerned with the sealing of the fitting. To achieve a contact pressure that is evenly distributed around the periphery of the slide plate, annular metal membranes are provided, the valve sealing plates being resiliently supported on the housing. Neither does that patent specification indicate how the lateral guide means, especially the housing-associated lateral guide means, of the slide plate is constructed.

The invention is based on the problem of improving the slide valve in accordance with the preamble in such a way that the wear on the pipe-associated guide elements is reduced.

That problem is solved according to the invention by a slide valve in accordance with claim 1. Structural details and further improvements of the slide valve according to the invention are defined in the subsidiary claims.

An important aspect of the invention therefore lies in providing a slide valve which is especially arranged for controlling a flow of catalyst or like high-temperature media, having a pipe portion and, arranged therein, a restrictor which has an inlet opening and an outlet opening through which flow takes place during operation, and having a slide plate which co-operates with the outlet opening to control the flow of media and which is movable into an open position and a closed position. The slide plate is mounted so as to be displaceable by means of guide elements arranged on the pipe and on the plate, which guide elements are in engagement with one another. The guide elements arranged on the pipe are protected from being impinged on by the flow of medium in the open position II. For that purpose, the guide elements can be arranged outside the media.

The pipe-associated guide elements can be arranged before the outlet opening in the direction of flow.

The arrangement of the pipe-associated guide elements before the outlet opening has the effect that the guide elements are removed from the region of the flow of media, at least from the region where wear is particularly high as a result of the turbulence that occurs. By virtue of that arrangement, it is also no longer necessary to lengthen the slide plate in order to cover the pipe-associated guide elements in the region of the restrictor aperture. The fitting can therefore be of very compact construction.

Preferably, the restrictor has a restrictor plate having a forward face and a rear face in the direction of flow, the outlet opening being provided in the rear face of the restrictor plate. The location of the outlet opening can be influenced by the spacing between the forward and rear faces. By appropriately setting the spacing between the forward and rear faces, that is to say by having a restrictor plate of suitable thickness, sufficient space for the arrangement of the pipe-associated guide elements is created in the region before the outlet opening.

In a further exemplary embodiment, at least one pipe-associated guide element can be arranged in or on the restrictor plate. As a result, the slide valve is simpler to manufacture, because the bearing of the guide element is integrated in the restrictor plate.

In that arrangement, at least one pipe-associated guide element can be arranged in the the region of a side edge of the restrictor plate. Because the side edge of the restrictor plate is arranged upstream of the rear face in the direction of flow, that arrangement makes it simple to provide the pipe-associated guide element(s) in the region before the outlet opening.

The at least one pipe-associated guide element can be L-shaped in cross-section. Such a guide element is simple to produce and ensures reliable guiding operation, it being possible for a horizontal limb of the L-shaped guide element to extend radially outwards with respect to the outlet opening. That guide arrangement is especially simple to produce.

Alternatively, it is possible for a horizontal limb of the L-shaped guide element to extend radially inwards with respect to the outlet opening, there being formed in the restrictor plate a recess for receiving the plate-associated guide element, which recess is bounded radially outwards by the L-shaped guide element. This has the result firstly that the pipe-associated guide element is displaced radially slightly outwards, so that its distance from the outlet opening is increased and the wear on the guide element is reduced. In addition, especially reliable guidance of the slide plate is obtained, because the plate-associated guide elements are guided laterally on both sides in the recess.

The plate-associated guide element can be constructed so as to be complementary to the associated pipe-associated guide element, especially being inversely L-shaped in cross-section, with the result that reliable guidance of the slide plate is ensured in a simple way.

In a further exemplary embodiment, at least one pipe-associated guide element is provided in the rear face of the restrictor plate. That means that the outlet face and the pipe-associated guide elements are provided on the same side of the restrictor plate, that is to say in the region of the rear face in the direction of flow, the pipe-associated guide elements being arranged upstream of the outlet opening in the direction of flow. By the arrangement of the pipe-associated guide elements in the restrictor plate, the guide elements are recessed in the restrictor plate and are accordingly especially well protected from the flow of media. In addition, as a result of that integrated construction, the width of the slide plate is made shorter, because no guide elements are provided laterally of the slide plate.

In that arrangement, the pipe-associated guide element can comprise a dovetail guide means or a T-groove guide means, each of which can simply be milled into the rear face of the restrictor plate.

Preferably, the pipe-associated guide elements are releasably joined to the restrictor plate and/or the plate-associated guide elements are releasably joined to the slide plate. The respective guide elements can then easily be mounted and exchanged.

In another embodiment, the guide elements, especially the pipe-associated guide rails, are covered in the open position of the slide plate. For that purpose, the axial longitudinal extent of the plate-associated guide rails is such that the plate-associated guide rails cover the pipe-associated guide rails substantially completely, at least in the open position of the slide plate.

The plate-associated guide rails accordingly not only have the function of guiding the slide plate laterally but also act as a protective covering or shield for the pipe-associated guide rails, because when the slide plate is in the open position the plate-associated guide rails cover the pipe-associated guide rails substantially completely, that is to say especially in the region of the restrictor aperture. Because the pipe-associated guide rails are covered in the region of the restrictor aperture, those guide rails are prevented from being exposed to the abrasive flow of media, so that wear on the pipe-associated guide rails is significantly reduced. The slide valve according to the invention therefore enables the maintenance intervals, at least in respect of the guide rails, to be extended.

Although slide valves are known in an extremely wide variety of forms, as described, for example, with reference to the above-mentioned specification, in many slide valves the lateral guide means is integrated into the side wall of the pipe housing and does not project into the flow cross-section of the slide valve, so that the wear problem described above does not arise. In the hot gas slide valve known from DE 1 031 596, the plate-associated lateral guide projections, especially in the region of the passage opening of the slide plate, are so short that it must be assumed that the housing-associated guide means not described in the patent specification are not completely covered.

Preferably, the slide valve is arranged for use in FCC units. That means that the slide valve has a refractory lining which is arranged or designed so as to withstand temperatures of about 720° C. and flows of catalyst having high speeds of about 10 m/s. The axial longitudinal extent of the plate-associated guide rails, provided as wear protection, is such that the plate-associated guide rails cover the pipe-associated guide rails substantially completely, at least in the open position II of the slide plate.

Preferably, the slide plate has a closure member, which in the closed position blocks the restrictor aperture, as well as an opening member having a passage opening which in the open position unblocks the restrictor aperture, the plate-associated guide rails being provided both in the region of the closure member and in the region of the opening member at least over the longitudinal extent of the passage opening. The length of the plate-associated guide rails in the region of the opening member therefore corresponds at least to the extent of the restrictor aperture in the direction of movement of the slide plate. Unlike the known slide valve shown in FIGS. 1, 2, the slide valve in accordance with this exemplary embodiment has a slide plate which has not only a closure member but also an opening member, the plate-associated guide rails being provided both in the region of the closure member and in the region of the opening member. The complete covering of the pipe-associated guide rails projecting into the flow cross-section in the region of the restrictor aperture is achieved in this exemplary embodiment as a result of the fact that the length of the plate-associated guide rails in the region of the opening member corresponds at least to the extent of the restrictor aperture in the direction of movement of the slide plate. In the open position, the flow of media passes through the restrictor aperture and the congruently arranged passage opening of the slide plate, the plate-associated guide rails provided in the region of the opening member being in engagement with the corresponding pipe-associated guide rails; the pipe-associated guide rails are covered in the region of the restrictor aperture and accordingly are protected from making contact with the abrasive flow of medium.

In a further exemplary embodiment, the pipe-associated guide rails extend beyond the region of the restrictor aperture in the direction of movement of the slide plate, at least corresponding to the extent of the restrictor aperture in the direction of movement of the slide plate. As a result, the stability of the lateral guide means is improved. A further improvement in the stability of the guide means is achieved when the pipe-associated guide rails extend on both sides beyond the region of the restrictor aperture, in each case at least corresponding to the extent of the restrictor aperture in the direction of movement of the slide plate. That means that the entire slide plate is laterally guided in any position, irrespective of whether the slide plate is moved into the open or closed position.

Preferably, the restrictor has a restrictor plate in which the restrictor aperture is formed, the restrictor plate extending on both sides beyond the restrictor aperture in the direction of movement of the slide plate, at least corresponding to the extent of the restrictor aperture in the direction of movement of the slide plate. In that way it is ensured that the slide plate, especially the closure member as well as the opening member of the slide plate, is in contact with the restrictor plate, this being the case both in the open position and in the closed position of the slide valve.

A simple construction of the guide system is achieved when the plate-associated guide rails each have an L-shaped profile in cross-section. Wear protection is improved when the plate-associated guide rails each have, in cross-section, a U-shaped profile which surrounds the respective pipe-associated guide rail at the top and bottom in the direction of flow. As a result, the pipe-associated guide rail in question is protected not only from above in the direction of flow, as in the case of the L-shaped cross-sectional profile, but also from below, so that, in that region too, wear phenomena, for example caused by turbulence, are minimised.

When the pipe-associated guide rails are of multi-part construction, especially two-part or three-part construction, in the longitudinal direction, they can readily be removed for maintenance purposes, it being possible, if necessary, for individual components of the guide rails, that is to say not the complete guide rail, to be exchanged.

The pipe-associated guide rails can be U-shaped in cross-section, thus ensuring reliable movement of the slide plate for opening or closing the valve.

The pipe-associated guide rail can comprise a horizontal limb, a perpendicular intermediate piece and a further horizontal limb, which are arranged in a U-shape and are releasably joined to one another. As a result, a three-part guide rail of U-shaped cross-section is created, which is particularly easy to maintain and reliable in operation.

It should be pointed out here that the different embodiments of the individual guide rails, for example the U-shaped and L-shaped constructions, can be combined with one another so that one of the guide rails is U-shaped and the other is L-shaped.

Simple demounting and mounting of the pipe-associated guide rails can be achieved by fixing the pipe-associated guide rail laterally to the housing of the slide valve, because the fixing is thus accessible from the outside.

Laterally next to the pipe-associated guide rail it is possible to arrange a holding means on which the restrictor plate is supported. That laterally arranged holding means provides the pipe-associated guide rail with additional protection against wear in the lateral region.

In a further possible method of fixing, the connecting plate has a recess for receiving a fixing means for joining the pipe-associated guide rail to the connecting plate.

In another exemplary embodiment, the slide plate has a closure member, the plate-associated guide rails provided in the region of the closure member projecting beyond the closure member in the axial longitudinal direction so that the projecting portion of the plate-associated guide rails covers the pipe-associated guide rails substantially completely in the region of the restrictor aperture. In that embodiment, the opening member is omitted, so that a free space is formed between the guide rails projecting axially beyond the closure member. In the open position of the slide, the free space is located below the restrictor aperture and has the medium flowing through it, the projecting plate-associated guide rails covering the pipe-associated guide rails in the region of the restrictor aperture and protecting them from the flow of media. That embodiment is especially economical and, furthermore, is suitable for retrofitting to existing slide valves. For that purpose it is merely necessary for the already known closure member to be joined to plate-associated guide rails that project beyond the closure member in the direction of movement of the slide plate.

The invention is described in greater detail below on the basis of exemplary embodiments, with reference being made to the diagrammatic drawings, wherein:

FIG. 1 shows, in cross-section, a slide valve which is used for controlling high-temperature flows, especially flows of catalyst, in blast furnace plants.

The closed position II of the slide valve is shown in FIGS. 1 to 4 and the open position is shown in FIGS. 5 to 8.

Figure 3:
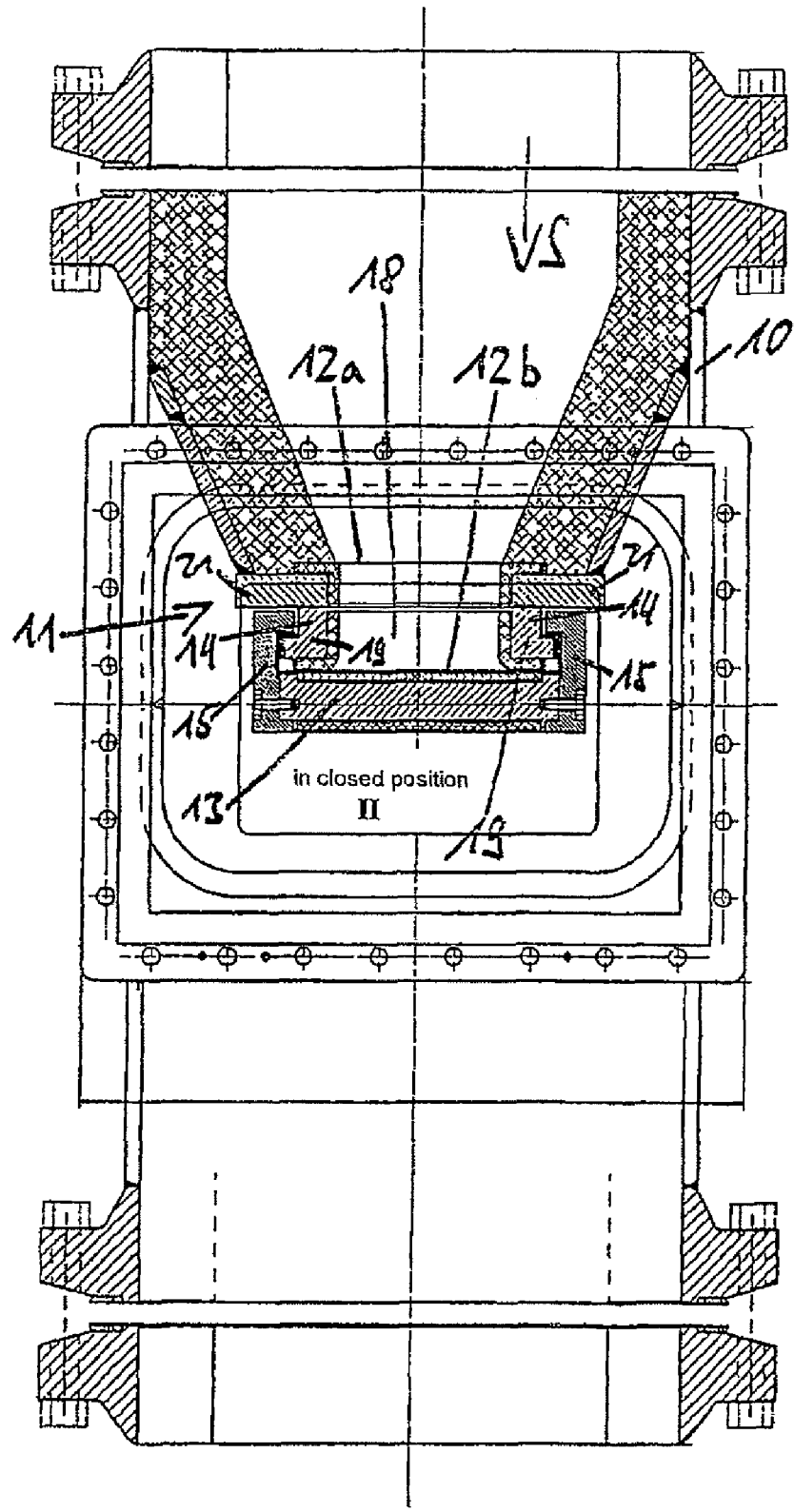
FIG. 3 is a view in accordance with FIG. 2, an alternative fixing of the plate-associated guide elements being provided.

The fitting comprises a pipe portion 10 which is lined with a refractory material 20 and which is connected to corresponding plant components by means of flanged connections. In the upper part of the pipe portion 10, seen in the direction of flow S, the refractory material 20 tapers and forms a funnel. At the end of the funnel, a restrictor 11 is provided which extends within the pipe portion 10 transversely to the direction of flow S. The outlet opening of the funnel opens into a restrictor aperture 12 provided in the restrictor 11, which restrictor aperture 12 is provided in a restrictor plate 19. The restrictor plate 19 is screwed to a connecting plate 21 which is joined to the wall of the pipe portion 10. The restrictor aperture 12 also extends through the connecting plate 21 and is lined with a wear-resistant material 22. A slide plate 13 is arranged downstream of the restrictor 11 in the direction of flow S, which slide plate 13 is movable transversely to the direction of flow S into a closed position I and into an open position II. In FIG. 3 the slide plate 13 is in the closed position I. For driving the slide plate 13, the slide plate is joined to a rod 23 which extends out of the interior of the slide valve and is coupled to a drive means (not shown). The bearing of the rod 23 is provided with an injection connection 24, by means of which nitrogen and white graphite powder as dry lubricant can be introduced.

Figure 9:
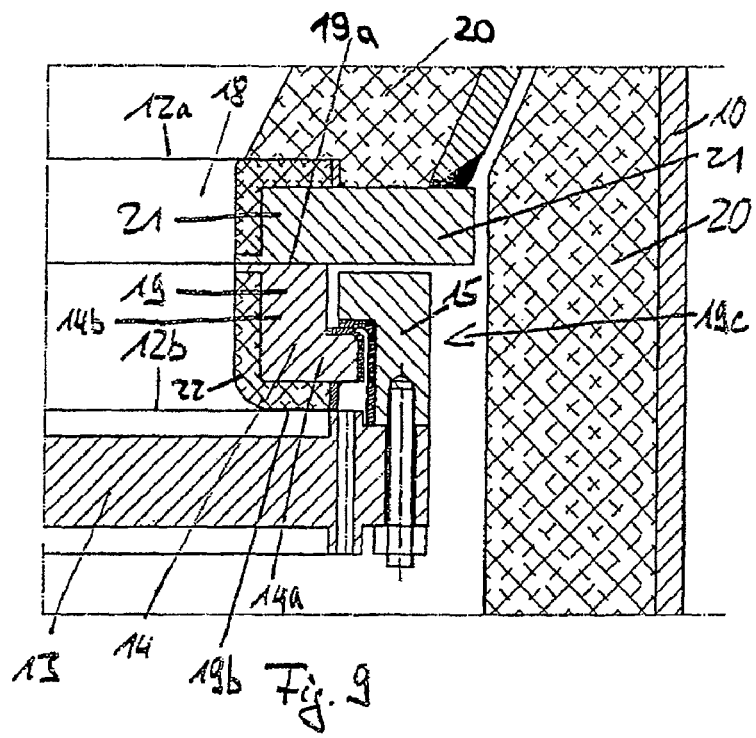
FIG. 9 shows a detail of the guide arrangement of the slide valve according to FIG. 2.

The restrictor aperture 12 has an inlet opening 12a and an outlet opening 12b, between which the passage 18 of the restrictor aperture 12 is formed. The outlet opening 12b is defined generally as the region where the flow of media leaves the restrictor 11, that is to say is discharged therefrom. Specifically, in this exemplary embodiment according to FIG. 1 the outlet opening 12b is defined by the lower edge of the restrictor aperture 12, seen in the direction of flow, i.e. by the wear-resistant material 22 with which the restrictor aperture 12 is lined (FIG. 9, 10). Without being limited thereto, the outlet opening 12b is provided in a plane arranged substantially perpendicular to the direction of flow S, in which plane the rear face 19b of the restrictor plate 19 in the direction of flow is also arranged, it being disregarded that the horizontal portion of the wear-resistant material 22 and the rear face 19b are slightly staggered.

The outlet opening 12b need not necessarily be arranged perpendicular to the direction of flow S. Also possible are other arrangements in which the outlet opening 12b is inclined relative to the direction of flow S.

The inlet opening 12a is defined generally as the face or the region where the flow of media enters the restrictor 11. In the present case, the inlet opening 12a and the outlet opening 12b are two parallel faces through which a stream of media flows in operation and in the open position I.

Figure 1:
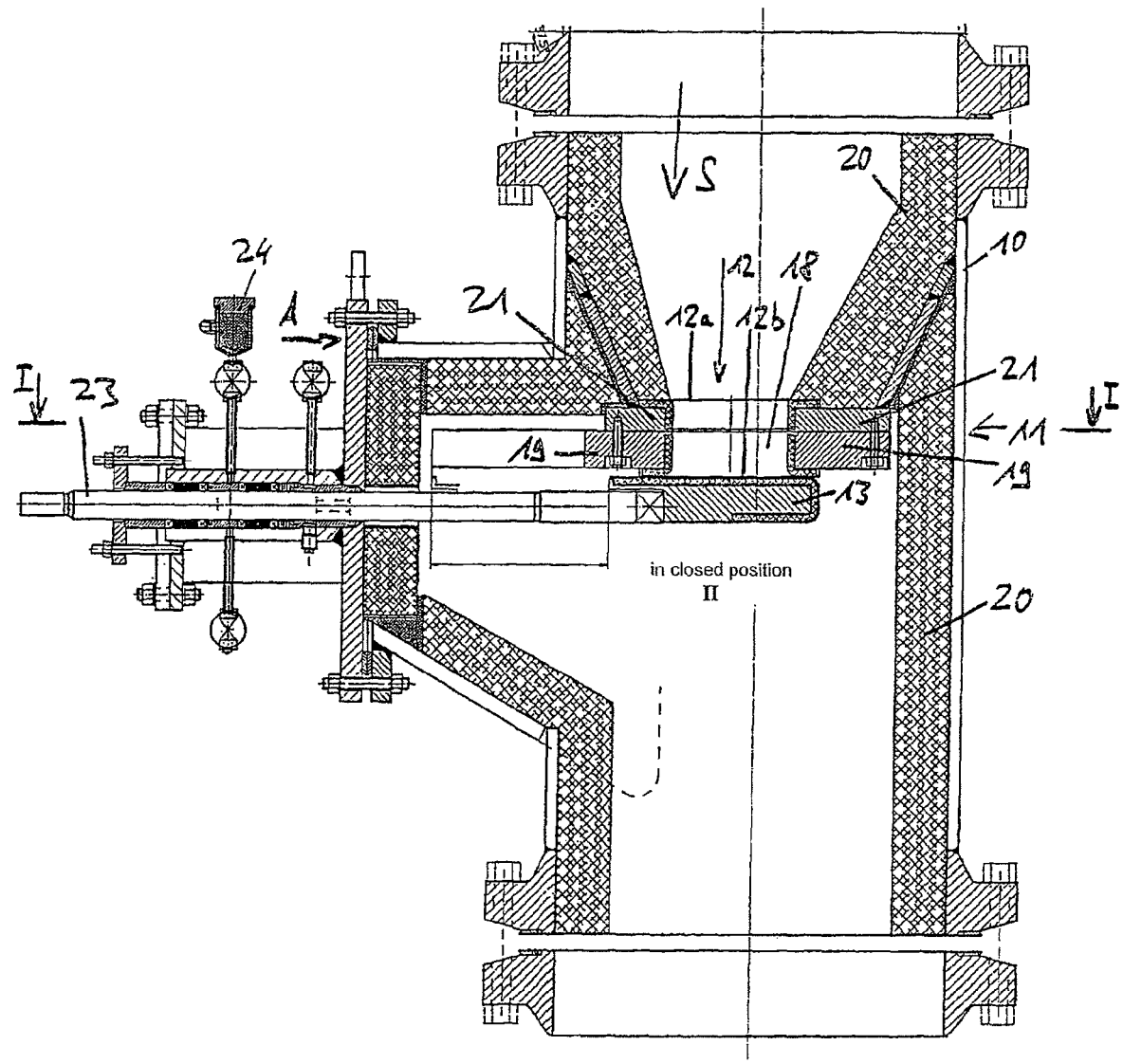
FIG. 1 is a lateral cross-section through a slide valve in accordance with an exemplary embodiment according to the invention, the slide valve being in the closed position II.

In the closed position II shown in FIG. 1, the slide plate 13 co-operates with the outlet opening 12b in such a way that the outlet opening 12b is completely closed.

Figure 4:
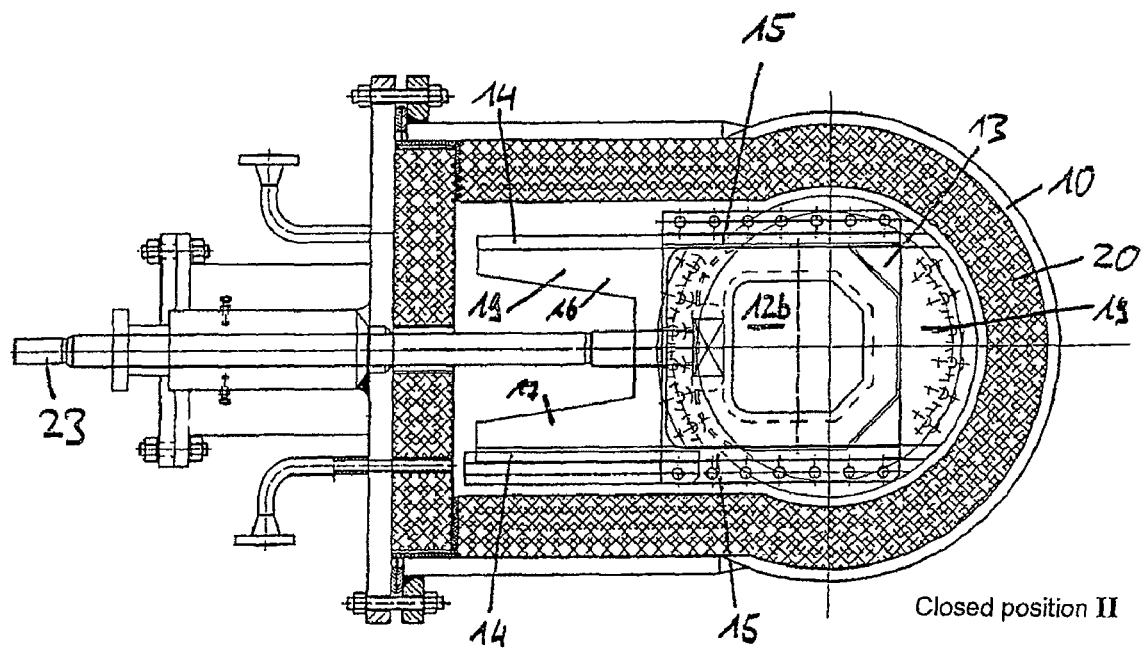
FIG. 4 is a cross-section through the slide valve according to FIG. 1 along line I-I in accordance with FIG. 1 and FIG. 2.
Figure 5:
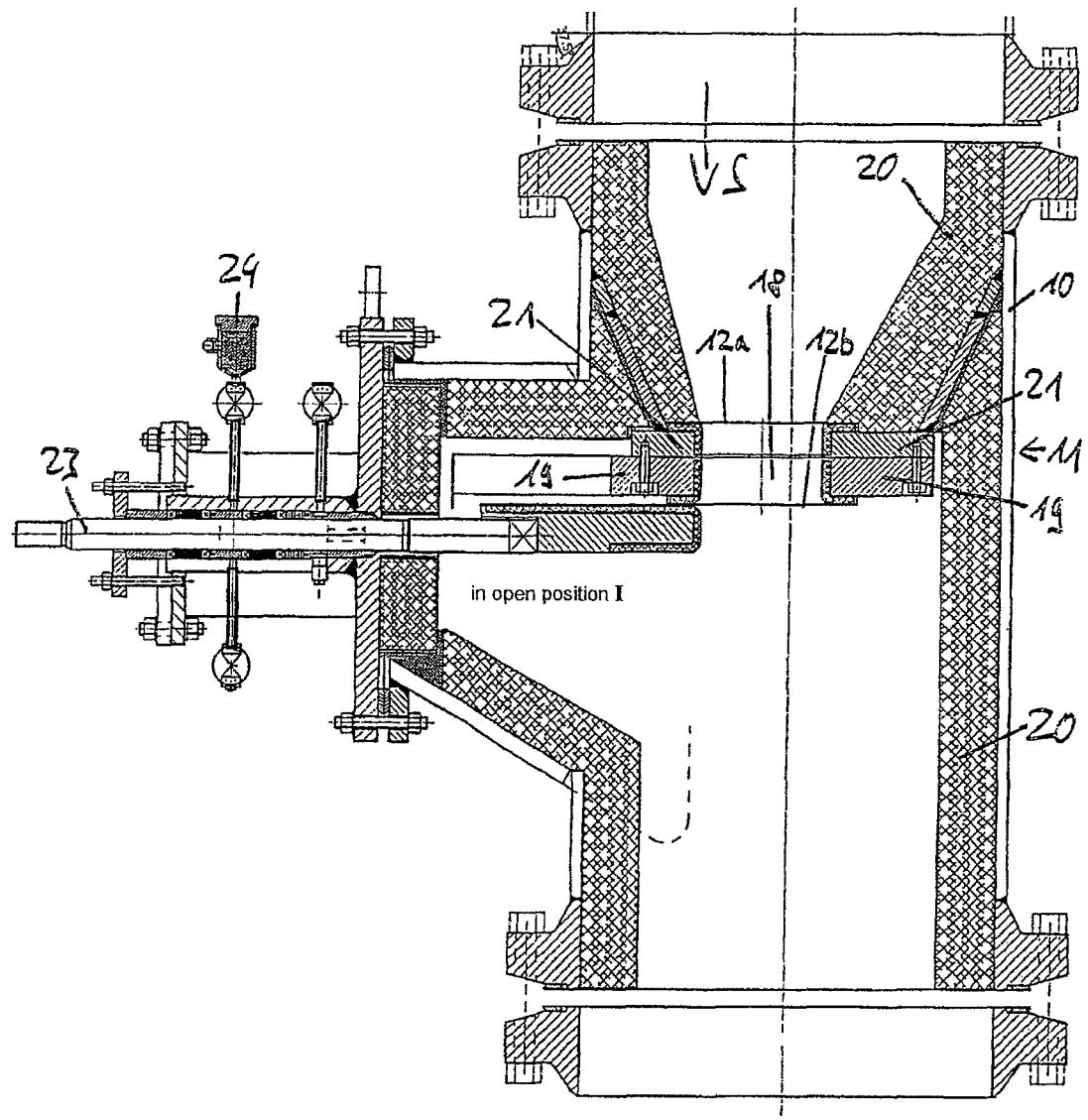
FIG. 5 shows the slide valve according to FIG. 1 in the open position I.
Figure 6:
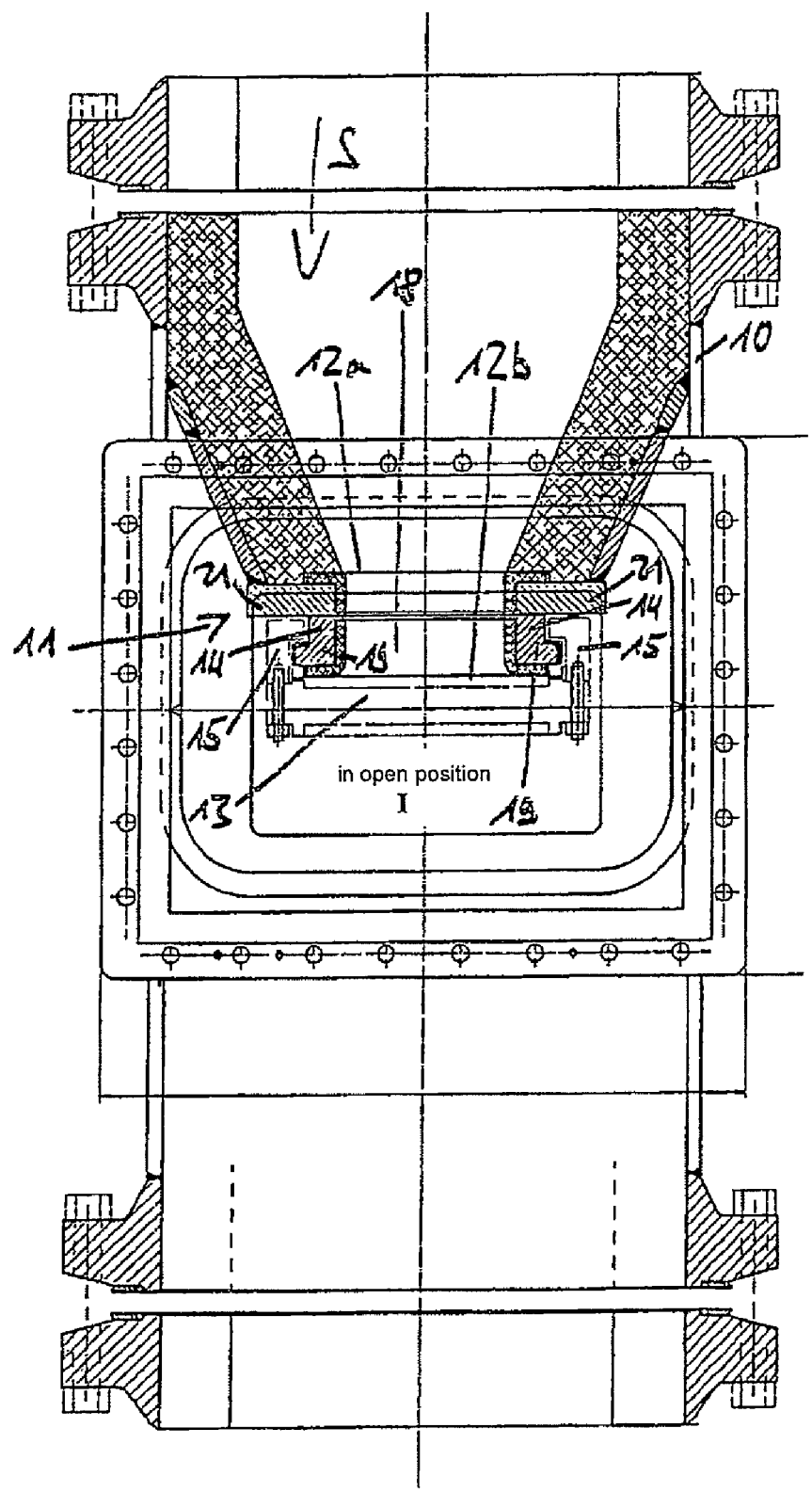
FIG. 6 shows a view in accordance with FIG. 2, the slide valve being in the open position I.
Figure 7:
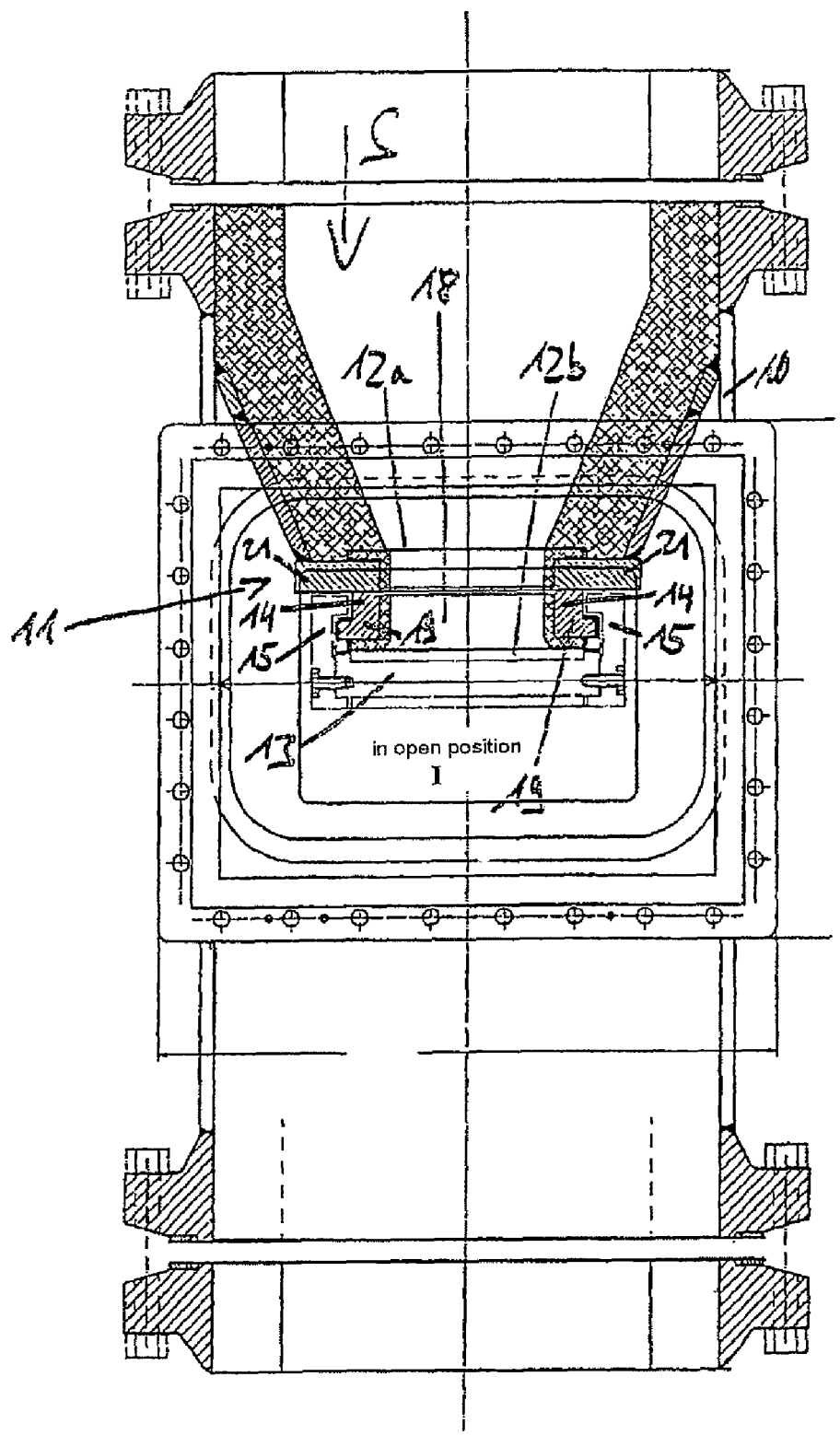
FIG. 7 shows the slide valve according to FIG. 3 in the open position.
Figure 8:
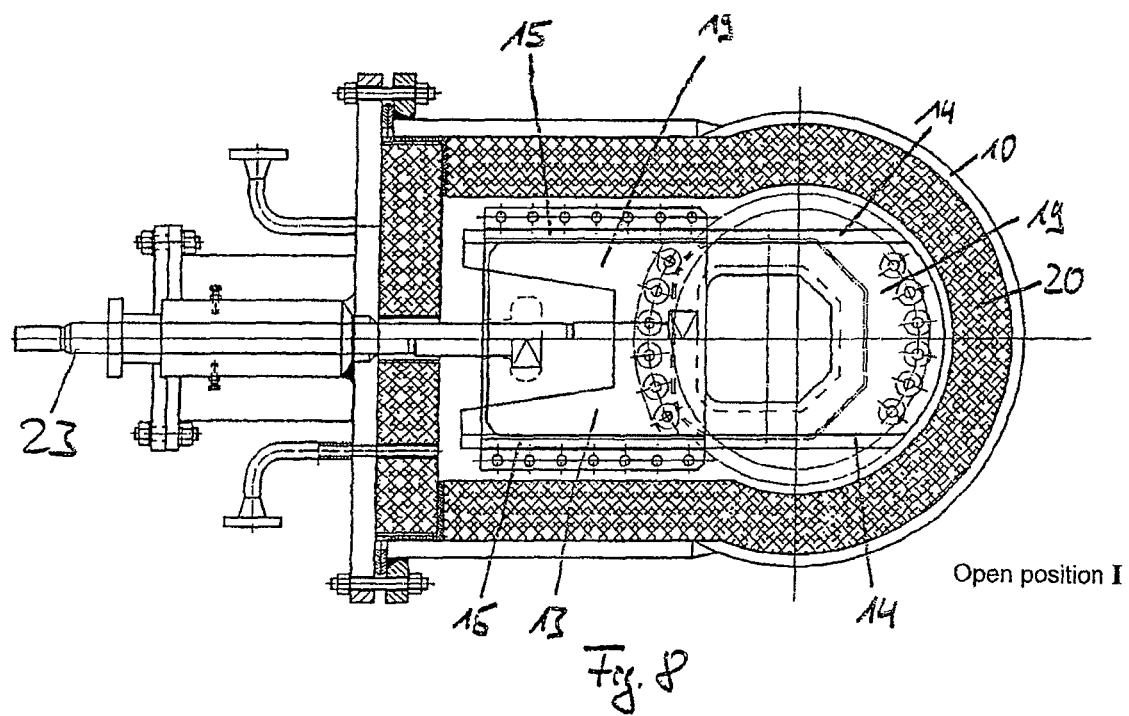
FIG. 8 shows the slide valve according to FIG. 4 in the open position.

The closed position II can be seen especially clearly in FIG. 4. It can be seen therein that the slide plate 13 has moved into the region of the restrictor 11 in such a way that the outlet opening 12b is covered by the slide plate 13. It can also be seen in FIG. 4 that the restrictor plate 19 is sufficiently long to ensure guidance of the slide plate 13 both in the closed position II shown in FIG. 4 and in the open position I shown in FIG. 8. For the guidance of the slide plate 13 there are provided guide elements 14 which are arranged laterally of the outlet opening 12b and extend in the longitudinal direction of the restrictor plate 19, that is to say in the direction of movement of the slide plate 13. The pipe-associated guide elements 14, that is to say the guide elements 14 provided in fixed position on or in the restrictor plate 14, are in engagement with plate-associated guide elements 15, that is to say with guide elements 15 arranged on the slide plate 13.

The guide elements 14, 15 can each be in the form of slide tracks, but other kinds of linear guide means are possible.

As shown in FIG. 4, the restrictor plate 19 has at its end remote from the outlet opening 12 a trapezoidal recess which is defined laterally by two trapezoidal limbs 16, 17. The two trapezoidal limbs 16, 17 taper as distance from the outlet opening 12b increases. The pipe-associated guide elements 14 are partly arranged and mounted in the region of the two trapezoidal limbs 16, 17, as shown in FIG. 4.

By virtue of that construction of the restrictor plate 19, firstly the weight of the plate is reduced. At the same time, it is ensured that the guide elements 14 are mounted sufficiently stably.

Figure 2:
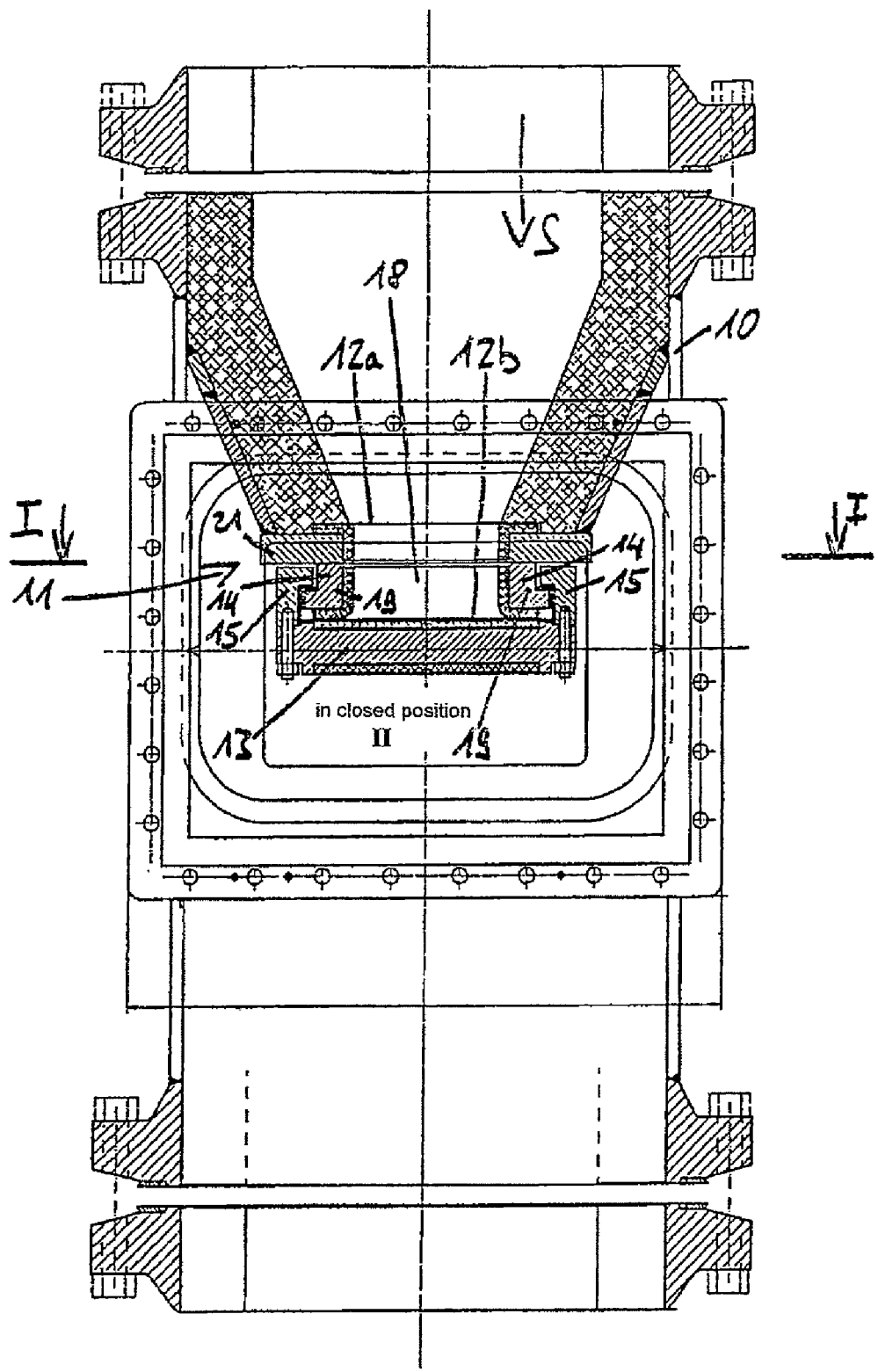
FIG. 2 is a front view in the direction of arrow A of the slide valve according to FIG. 1 omitting the slide rod, the slide valve being partly in section in the region of the restrictor.
Figure 14:
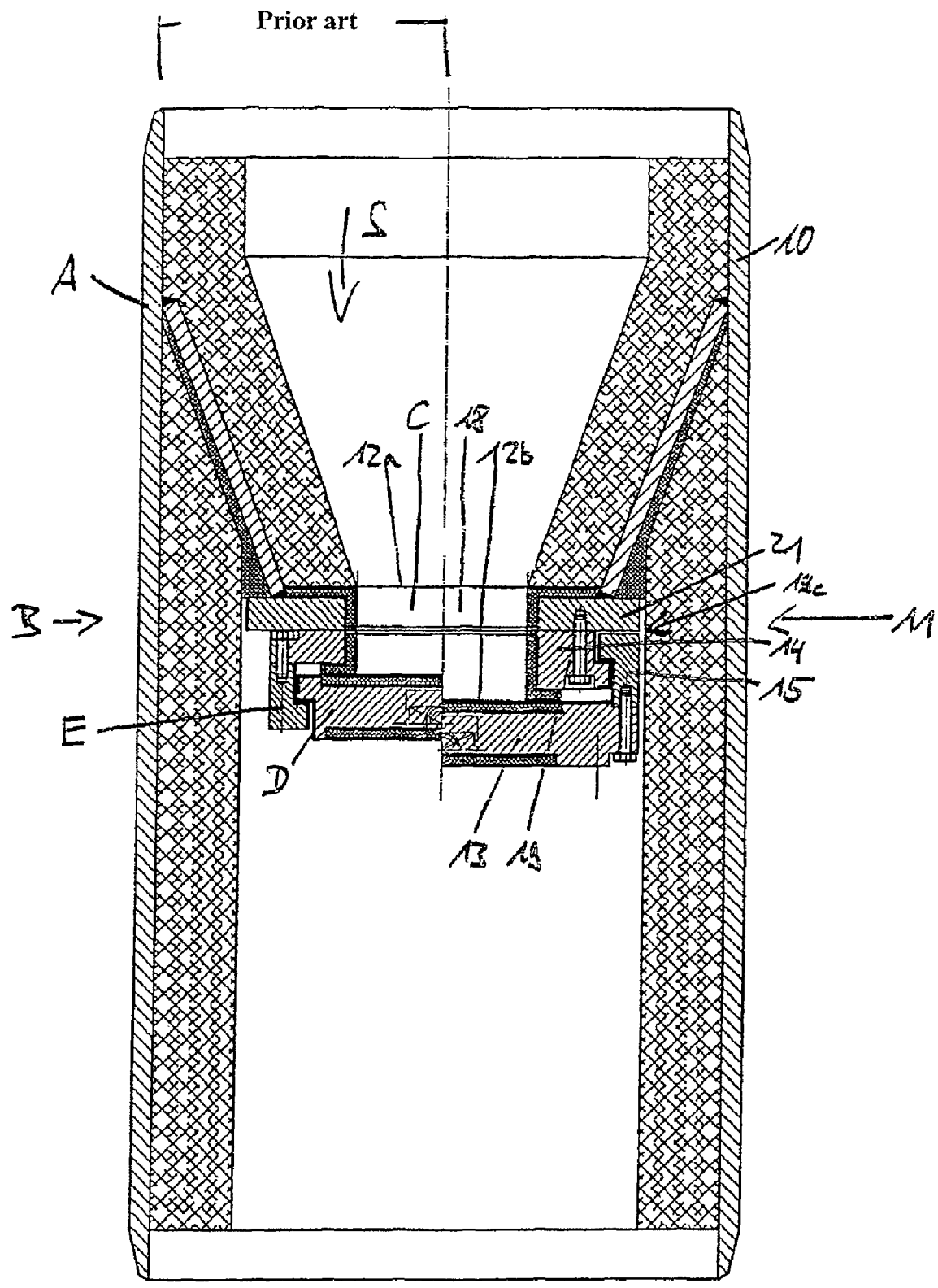
FIG. 14 is a comparison of a slide valve in accordance with the prior art (left-hand partwise section) and a slide valve in accordance with an exemplary embodiment according to the invention (right-hand partwise section)

In FIGS. 2, 3 and in the comparison in accordance with FIG. 14, it can clearly be seen that the two pipe-associated guide elements 14 are arranged before the outlet opening 12b in the direction of flow. It is also possible for only one pipe-associated guide element to be arranged before the outlet opening in the direction of flow. The other pipe-associated guide element can be protected against the flow of media in some other way.

The upstream arrangement of the guide elements 14 with respect to the outlet opening 12b means that in the open position I the flow of media, on flowing through the restrictor 11, first passes the pipe-associated guide elements 14 before it emerges from the restrictor 11, the pipe-associated guide elements 14 being arranged laterally spaced apart and separated from the restrictor passage 18 and not coming into contact with the flow of media or at least not coming into contact with the turbulent region of the flow of media. The upstream arrangement of the guide elements 14 means that they are arranged in a dead space of the slide valve where the conditions give rise to less wear. In other words, the outlet opening 12b is provided after the pipe-associated guide elements 14 in the direction of flow.

The arrangement of the pipe-associated guide elements 14 before the outlet opening 12b can be effected in various ways.

Generally, the guide elements 14 are provided in the region laterally of the outlet opening 12b. Preferably, the guide elements are provided in or on the restrictor plate 19. Other arrangements or fixings of the pipe-associated guide elements 14 are possible. For example, the guide elements 14, instead of being fixed to the restrictor plate 19, can be integrated into the refractory material 20 of the lining of the fitting, it being necessary to ensure that the guide elements are arranged so that they are located upstream of the outlet opening 12b in the direction of flow S.

In the exemplary embodiments shown in FIGS. 2, 3 and in FIGS. 9 to 11 and 14, the pipe-associated guide elements 14 are provided in the region of the side edges 19c of the restrictor plate 19.

Figure 10:
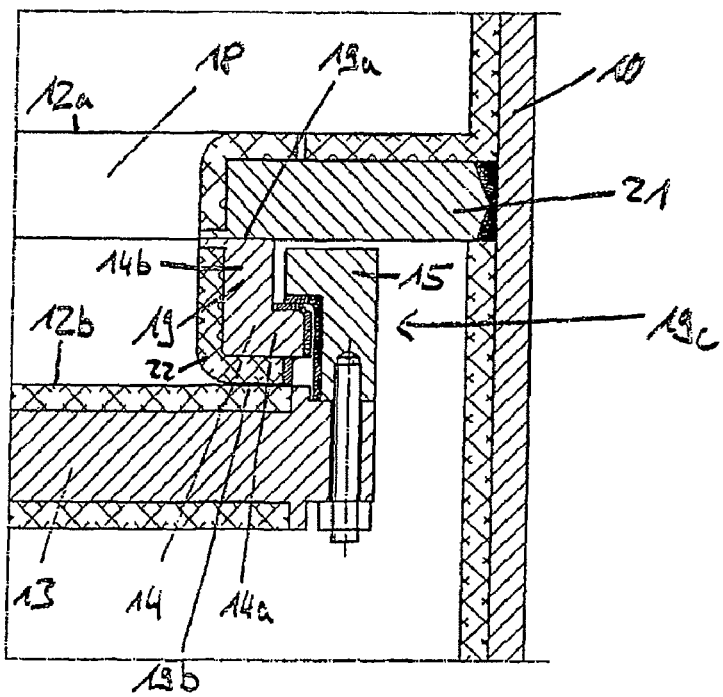
FIG. 10 shows a similar guide arrangement to the slide valve according to FIG. 9.

In the exemplary embodiments in accordance with FIGS. 9, 10, the side edge 19c of the restrictor plate 19 is L-shaped in cross-section and therefore has a shoulder which is in engagement with the complementary plate-associated guide element 15. Specifically, the side edge 19c, which is in the form of an L-shaped guide element 14, has a horizontally arranged limb 14a and a perpendicularly arranged limb 14b. The horizontal limb 14a extends radially outwards with respect to the outlet opening 12b. In the closed position II shown in FIGS. 9, 10, the plate-associated guide element 15 engages over the associated horizontal limb 14a, the plate-associated guide element 15 accordingly being slidably mounted on the fixed pipe-associated guide element 14.

The exemplary embodiments in accordance with FIGS. 9, 10 differ essentially in the arrangement of the refractory lining 20.

The fixing of the plate-associated guide elements 15 to the slide plate 13 can be effected in different ways.

As shown in FIG. 2, the guide element 15, which is inversely L-shaped in cross-section, can be screwed to the forward face of the slide plate 13 in the direction of flow S. Specifically, a blind-hole thread can be formed in the perpendicular limb of the guide element which is inversely L-shaped in cross-section, which thread is in alignment with a through-bore arranged in the side edge region of the slide plate 13. The plate-associated guide element 15 can in that way be screwed to the slide plate 13 from below by means of vertically arranged screws.

As an alternative thereto, the perpendicular limb of the plate-associated guide element 15 can be lengthened, as shown in FIG. 3, so that the lengthened limb extends beyond the thickness of the slide plate 13. The lengthened limb of the plate-associated guide element 15 is then screwed laterally to the slide plate 13 by means of horizontally arranged screws. For positioning the guide element 15 there is provided on the end of the perpendicular limb that is remote from the vertical limb of the guide element 15 a projection which engages in a corresponding recess in the slide plate 13.

It is also possible for the guide elements 15 to be constructed in one piece with the slide plate 13.

Figure 11:
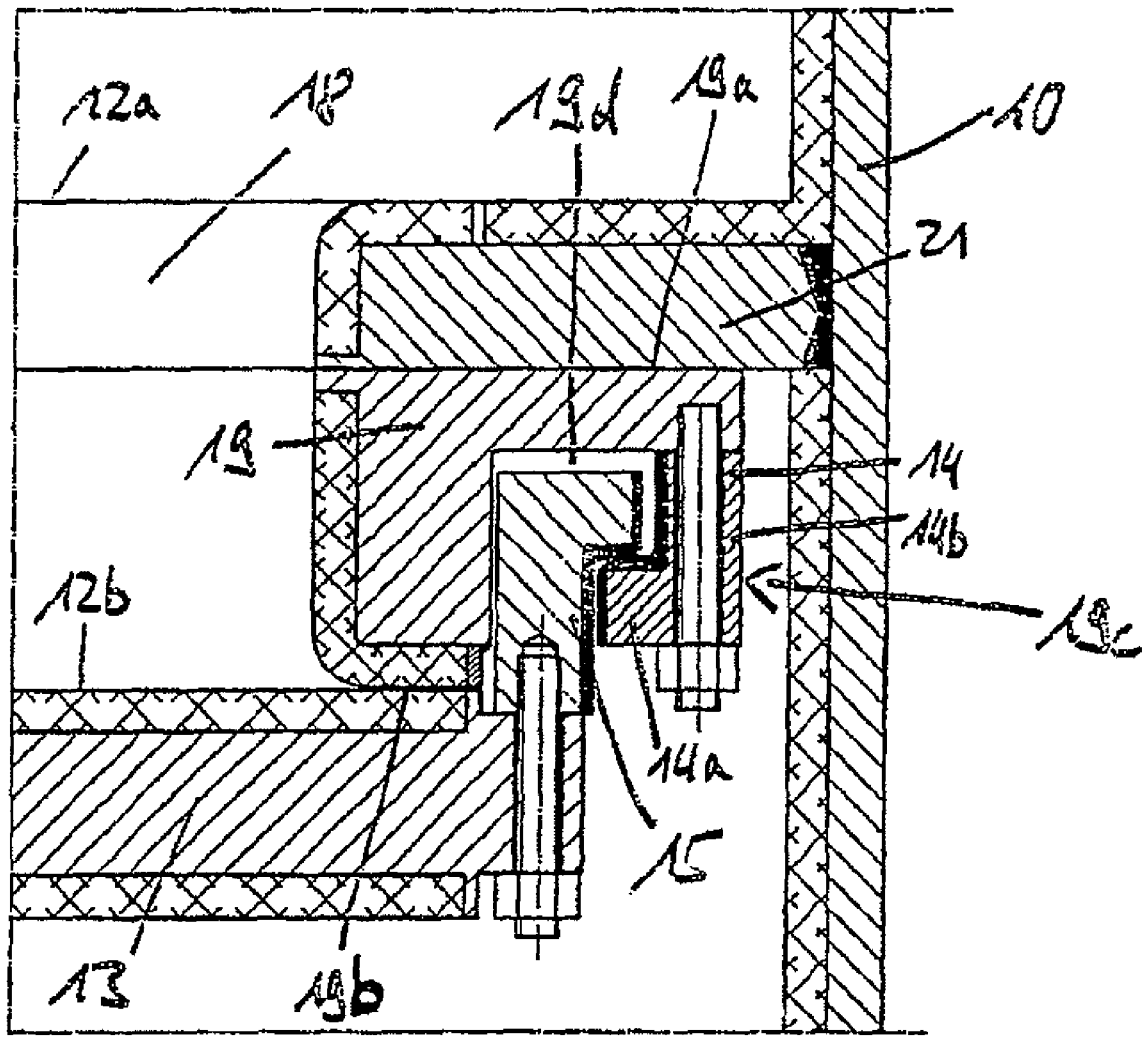
FIG. 11 shows an alternative guide arrangement with an internal horizontal guide limb.

In the exemplary embodiment according to FIG. 11, the pipe-associated guide element 14 is likewise provided in the region of the side edge 19*c* of the restrictor plate 19. Unlike the exemplary embodiment according to FIG. 10, the horizontal limb 14*a* of the L-shaped guide element 14 extends radially inwards with respect to the outlet opening 12*b*. In addition, a recess 19*d* is provided in the restrictor plate 19, which recess is defined radially inwards by a vertical edge of the restrictor plate 19. The recess 19*d* is defined radially outwards by the L-shaped guide element 14, the perpendicular limb 14*b* being arranged parallel to the perpendicular edge of the restrictor plate 19. Between the perpendicular edge of the restrictor plate 19 and the horizontal limb 14*a* of the guide element 14 there is a gap which opens into the recess 19*d*. In operation, the plate-associated guide element 15 is arranged in the recess 19*d*, which guide element is in this case constructed in the form of an inversely L-shaped guide element so as to be complementary to the pipe-associated guide element 14. The two guide elements 14, 15 are each screwed to the restrictor plate 19 and the slide plate 13, respectively.

A feature common to the exemplary embodiments described above is that the guide elements 14, 15 are arranged in the region of the side edge of the restrictor plate. Because the side edge 19*c* is arranged upstream of the outlet opening 12*b*, that arrangement has the effect that the guide elements 14, 15, especially the pipe-associated guide elements 14, are arranged before the outlet opening 12*b*.

Figure 12:
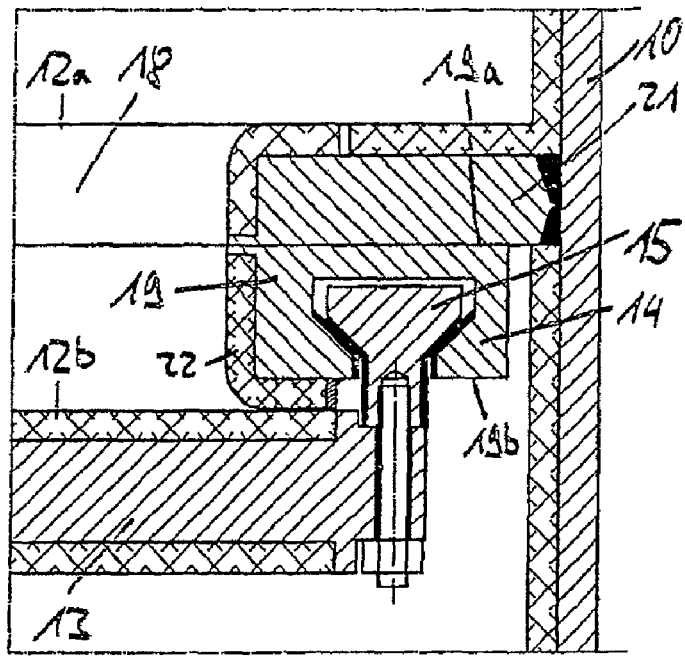
FIG. 12 shows a guide arrangement with a dovetail guide means.
Figure 13:
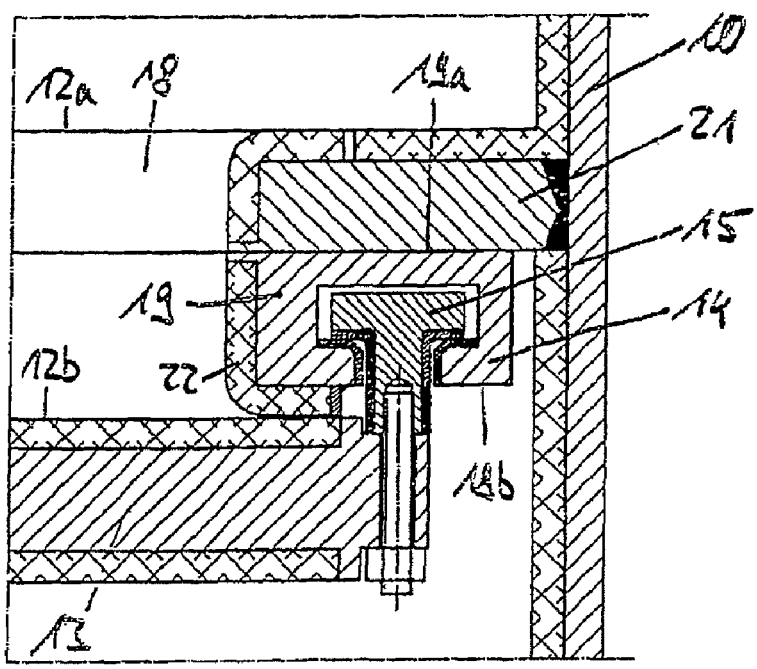
FIG. 13 shows a guide arrangement with a T-groove guide means.

Instead of the arrangement of the guide elements 14, 15 in the region of the side edge 19*c* it is also possible to provide the guide elements 14, 15 in the rear face 19*b* of the restrictor plate 19, as shown in FIGS. 12, 13. According to FIG. 12, the pipe-associated guide element 14 is integrated into the restrictor plate 19, more specifically in the form of a dovetail guide means (FIG. 12) or in the form of a T-groove guide means (FIG. 13). The associated plate-associated guide elements are each of appropriately complementary construction. The guide elements are screwed to the slide plate 13 or joined thereto in some other way.

The two exemplary embodiments according to FIGS. 12, 13 bring about especially good resistance to wear, because all the guide arrangements are recessed in the restrictor plate 19. In addition, by virtue of the construction of the pipe-associated guide elements 14 in the rear face 19*b* of the restrictor plate 19, the width of the arrangement is reduced, with the result that an especially compact construction is possible.

The construction of the pipe-associated guide elements 14 in the rear face 19*b* of the restrictor plate 19 means that the guide elements 14, starting from the rear face 19*b*, extend into the restrictor plate 19, with the result that the pipe-associated guide elements 14 are arranged before the outlet opening 12*b*.

That is all the more so when the lining of the passage 18 with the refractory material 22 is taken into account, with the result that the outlet opening 12*b* is spaced apart from the rear face 19*b* of the restrictor plate 19, that being the case in the direction of flow S. For the case where the lining by the refractory material 22 is let into the rear face 19*b* of the restrictor plate 19 (as in the region of the passage opening 18), it is likewise the case that the guide elements 14 are arranged upstream of the outlet opening 12*b*.

The forward face 19*a* of the restrictor plate 19 in the direction of flow S rests against the connecting plate 21, as shown in FIGS. 12, 13. The restrictor plate 19 is screwed to the connecting plate 21 (FIG. 1). Some other construction of the restrictor plate 19 is also possible. For example, the connecting plate 12 and the restrictor plate 19 can be of one-piece construction. The thickness of the restrictor plate 19, that is to say the distance between the forward face 19*a* and the rear face 19*b*, which distance governs the location of the outlet opening, determines the space available for the arrangement of the pipe-associated guide elements 14 before the outlet opening 12*b*. The thickness of the restrictor plate 19 is therefore to be selected in dependence upon the size of the guide elements 14. For example, on integration of the dovetail guide means into the rear face 19*b* there can be used a comparatively thinner restrictor plate 19 than in the case of the guide element 14 that is L-shaped in cross-section in accordance with FIG. 11, which has an internally arranged horizontal limb 14*a*.

With regard to the space available for the pipe-associated guide element 14, it is therefore generally a matter of providing a sufficient distance between the inlet opening 12*a* and the outlet opening 12*b* of the restrictor 11 so that the pipe-associated guide elements 14 can be arranged between the inlet opening 12*a* and the outlet opening 12*b*. For that purpose it is advantageously possible to construct the restrictor plate 19 accordingly. It is also possible to construct the connecting plate 21 and the restrictor plate 19 in one piece or to select some other construction of the restrictor 11, provided that the distance between the inlet opening 12*a* and the outlet opening 12*b* of the restrictor 11 is such that the pipe-associated fixed-position guide elements 14 can be arranged before the outlet opening 12*b* in the direction of flow S.

The comparison of the exemplary embodiment according to the invention in accordance with FIG. 14, right-hand partwise section, with the prior art, clearly shows the advantages achievable by the invention. By the arrangement of the pipe-associated guide elements 14 in the region of the side edge 19*c* of the restrictor plate 19 it is ensured that the pipe-associated guide elements 14 are arranged upstream before the outlet opening 12*b* or outlet face 12*b* of the restrictor aperture 12 in the direction of flow S. In contrast thereto, in the prior art the pipe-associated guide elements E are arranged downstream of the outlet opening 12*b*. The arrangement of the pipe-associated guide elements 14 in the region of the side edge 19*c* of the restrictor plate and accordingly their arrangement before the outlet opening 12*b* has the effect that the guide elements 14 are removed from the region of the flow of media, so that in the open position I of the slide valve they are not exposed to the flow of media or at least are exposed thereto to a lesser extent. As a result, the wear on the pipe-associated guide elements 14 is significantly reduced. In the exemplary embodiment according to FIG. 14, right-hand partwise section, the restrictor plate 14 is made thicker than in the prior art in order to accommodate the guide elements 14 arranged in the region of the side edge 19. The outlet opening 12*b* is thus displaced downwards in the direction of flow S compared with the prior art. The space laterally of the restrictor plate 19, which space is not utilised in the prior art, is utilised for the arrangement of the guide elements 14 in the exemplary embodiment according to the invention in accordance with FIG. 14, right-hand partwise section.

The slide faces of the guide elements 14, 15 are coated with a suitable low-friction material. In addition, the guide elements 14, 15 are each releasably joined to the restrictor plate 19 and to the slide plate 13, respectively, so that the guide elements 14, 15 can easily be exchanged or attached for maintenance or mounting. The guide elements 14, 15 are in the form of slide tracks or rails. Other guidance systems are possible.

The invention is especially suitable for use in refineries, especially in FCC units, without being limited thereto. Other possible applications in which abrasive or corrosive media have to be controlled are possible.

Figure 15:
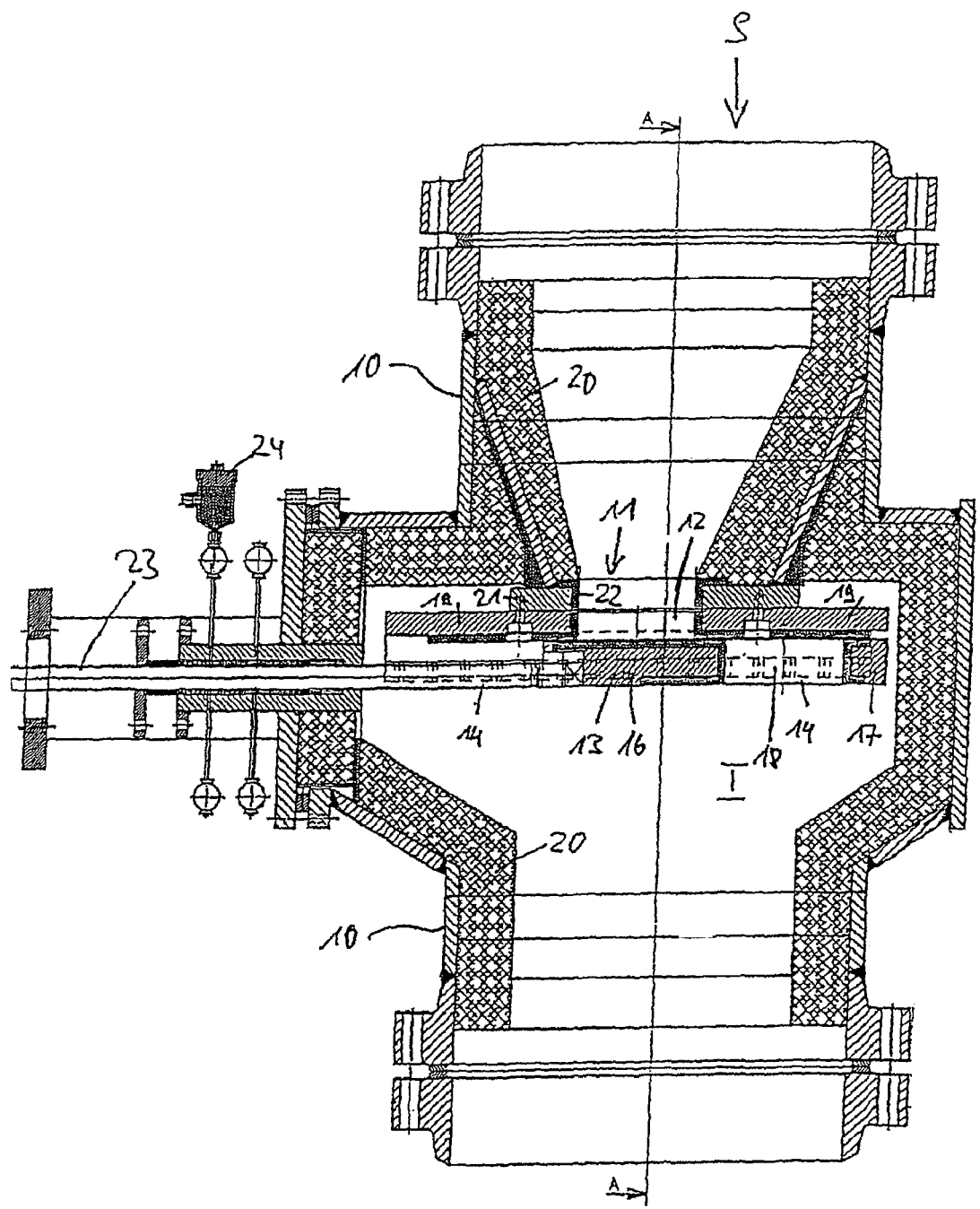
FIG. 15 is a cross-section through a slide valve in accordance with a further exemplary embodiment of the invention in the closed position.

FIG. 15 shows, in cross-section, a slide valve which is used for controlling high-temperature flows, especially flows of catalyst, in blast furnace plants. The fitting comprises a pipe portion 10 which is lined with a refractory material 20 and which is connected to corresponding plant components by means of flanged connections. In the upper part of the pipe portion 10, seen in the direction of flow S, the refractory material 20 tapers and forms a funnel. At the end of the funnel, a restrictor 11 is provided which extends within the pipe portion 10 transversely to the direction of flow S. The outlet opening of the funnel opens into a restrictor aperture 12 provided in the restrictor 11, which restrictor aperture 12 is provided in a restrictor plate 19. The restrictor plate 19 is screwed to a connecting plate 21 which is joined to the wall of the pipe portion 10. The restrictor aperture 12 also extends through the connecting plate 21 and is lined with a wear-resistant material 22. A slide plate 13 is arranged downstream of the restrictor 11 in the direction of flow S, which slide plate 13 is movable transversely to the direction of flow S into a closed position I and into an open position II.

In FIG. 15 the slide plate 13 is in the closed position I. For driving the slide plate 13, the slide plate is joined to a rod 23 which extends out of the interior of the slide valve and is coupled to a drive means (not shown). The bearing of the rod 23 is provided with an injection connection 24, by means of which nitrogen and white graphite powder as dry lubricant can be introduced.

Figure 16:
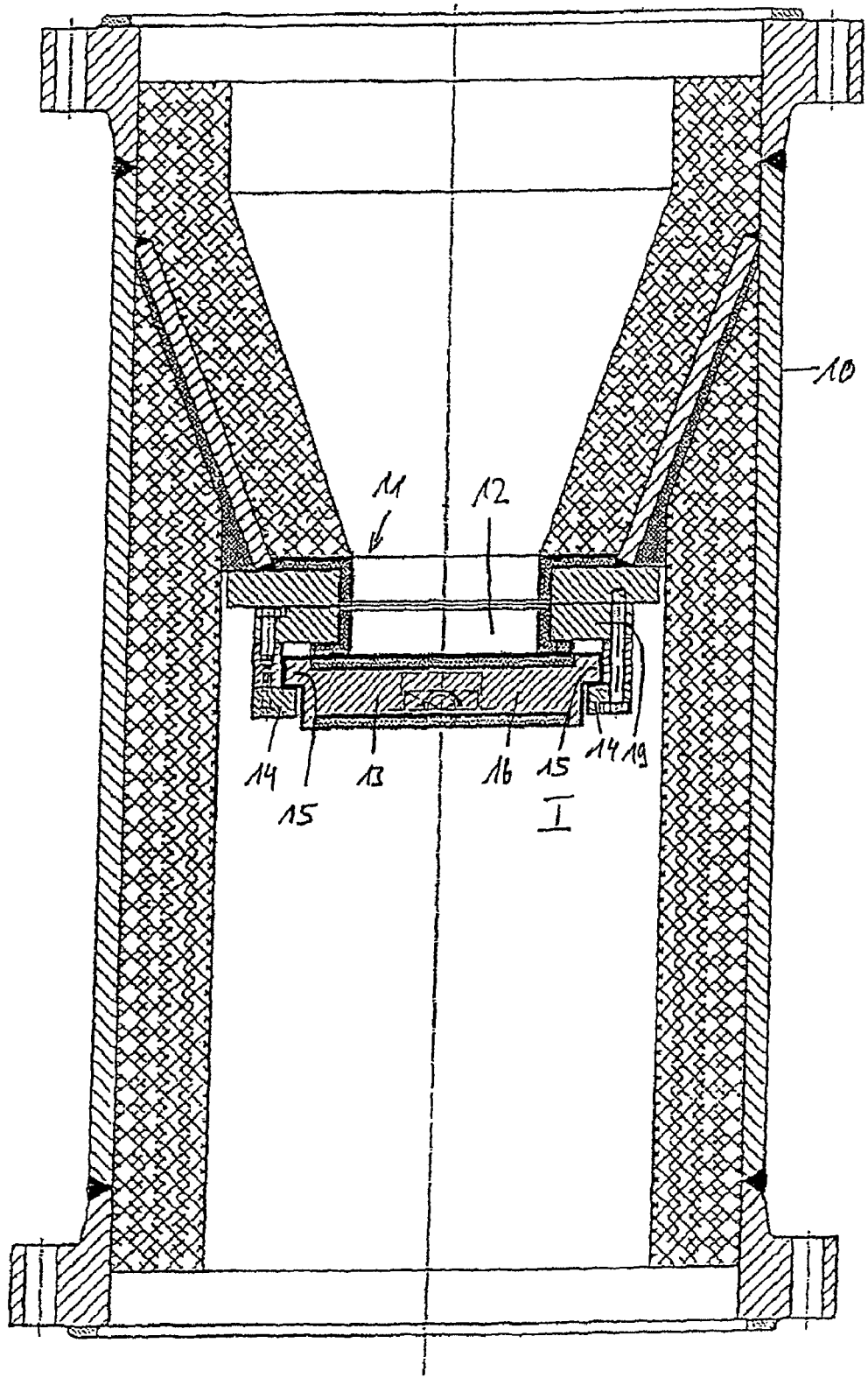
FIG. 16 is a section along line A-A according to FIG. 3.

As can be seen in FIG. 15 and even more clearly in FIG. 16, the slide plate 13 is mounted by means of pipe-associated guide rails 14 which are arranged laterally of the restrictor aperture 12 and are screwed to the restrictor plate 19, the pipe-associated guide rails 14 projecting into the flow cross-section of the pipe portion 10. On the two axial longitudinal sides of the slide plate 13 there are arranged appropriate guide rails 15 which, together with the pipe-associated guide rails 14, form a track system by means of which the slide plate 13 is slidably mounted. Instead of the guide rails 14, 15, it is also possible in principle to use other guide means, for example having rollers, but the guide rails 14, 15 are especially suitable for this application on account of their robustness.

Figure 17:
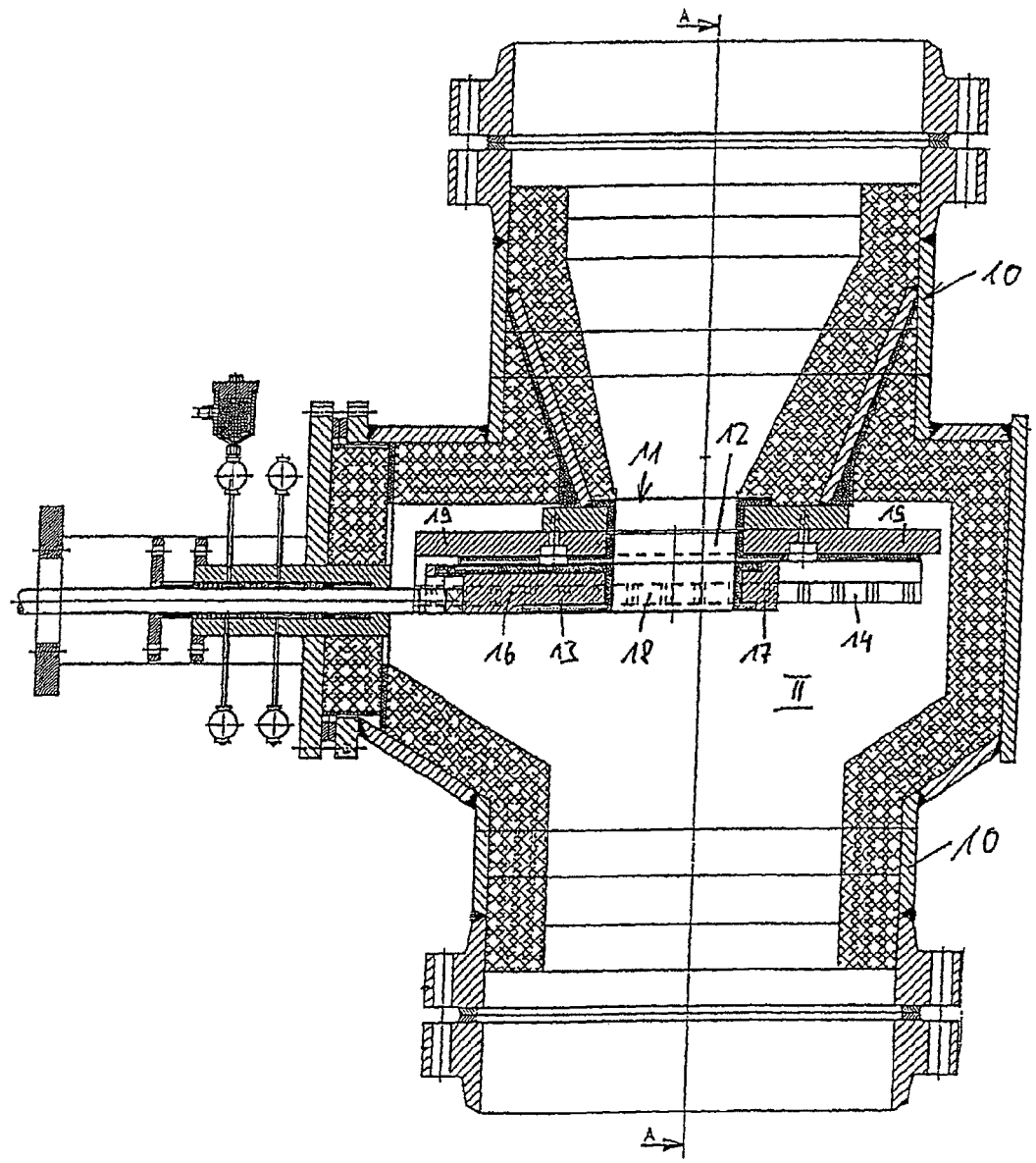
FIG. 17 is a cross-section through the slide valve according to FIG. 3 in the open position.
Figure 18:
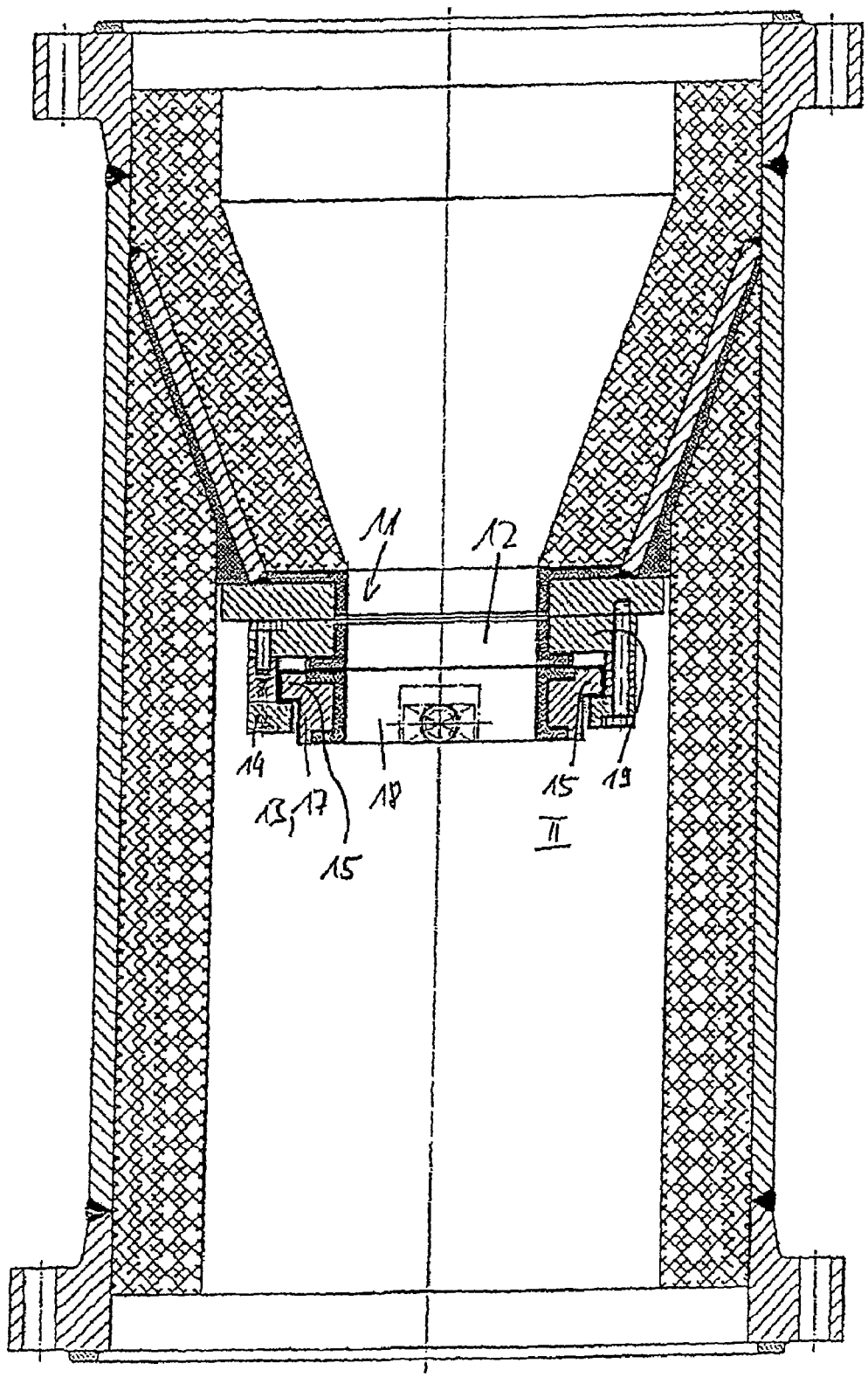
FIG. 18 is a section along line A-A according to FIG. 5.
Figure 19:
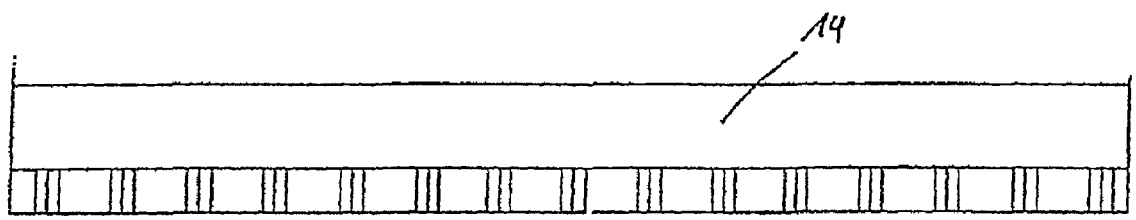
FIG. 19 shows a side view and a plan view of the pipe-associated guide rails according to FIG. 3.
Figure 19:
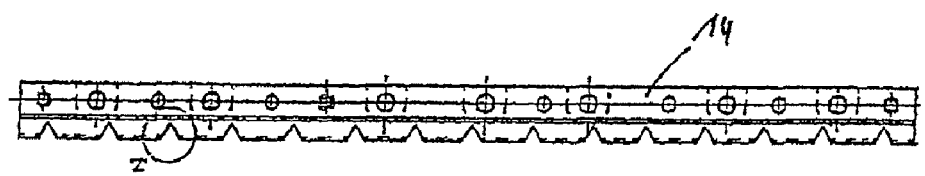
Figure 19:
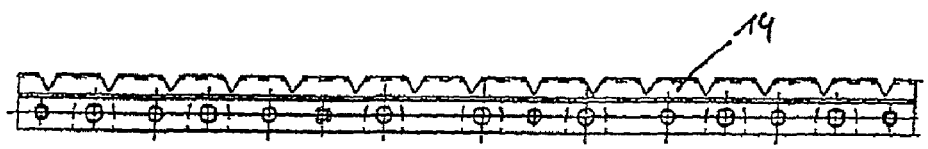
Figure 20:
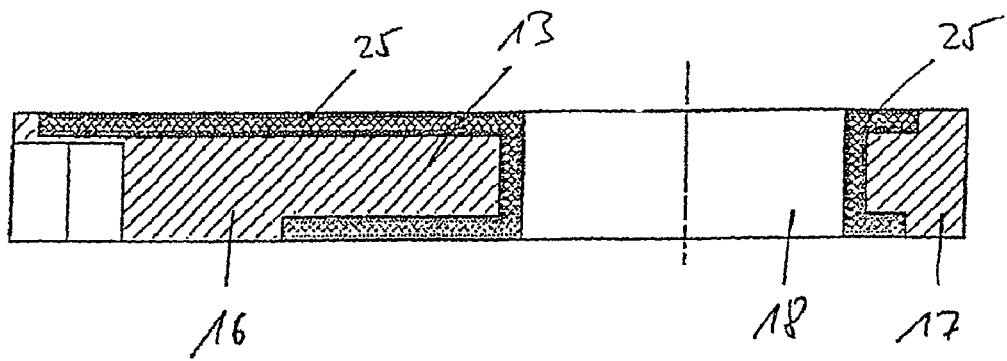
FIG. 20 shows, in cross-section and in plan view, the slide plate according to FIG. 3.
Figure 20:
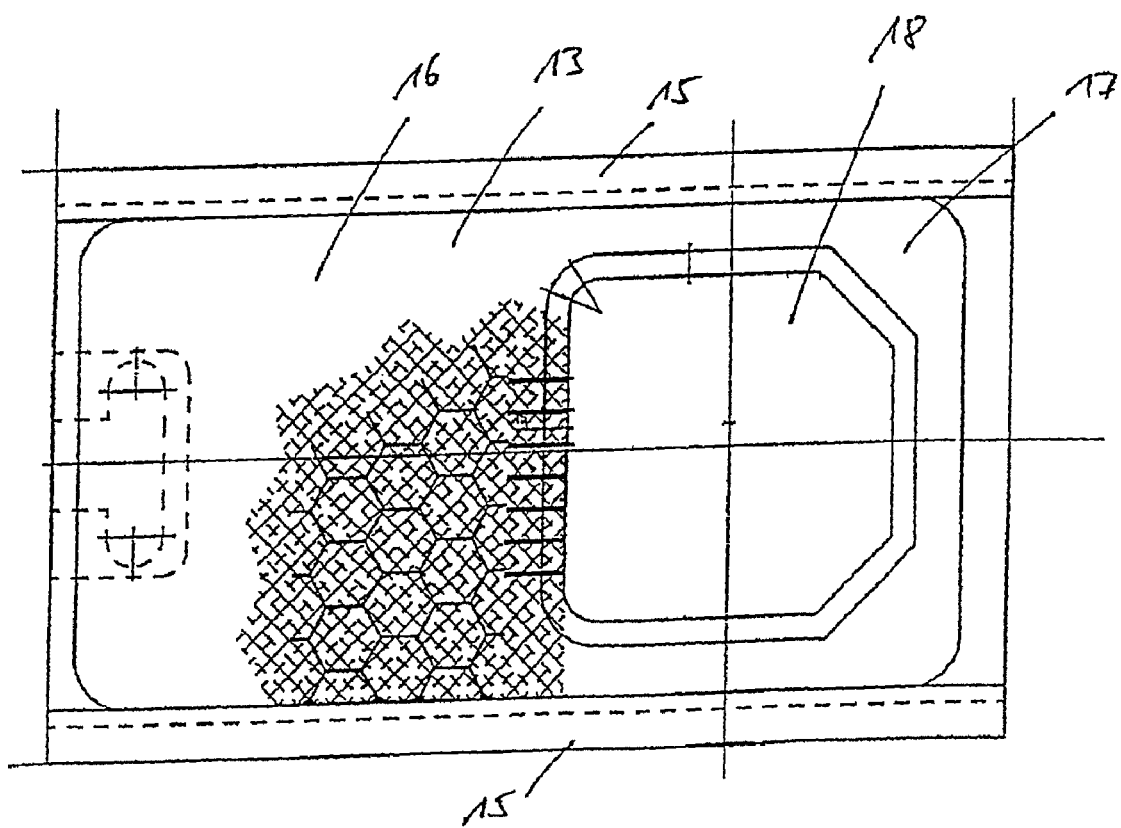
Figure 22:
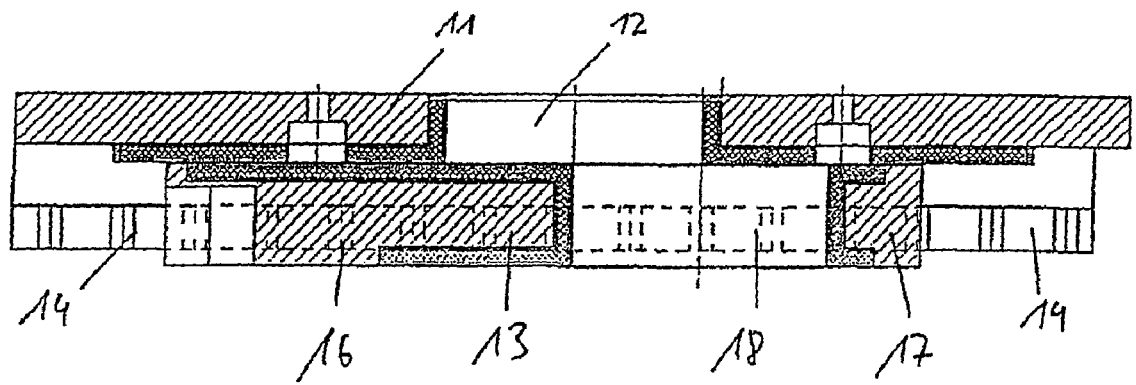
FIG. 22 shows, in cross-section and in plan view, the slide plate/restrictor arrangement according to FIG. 3.
Figure 22:
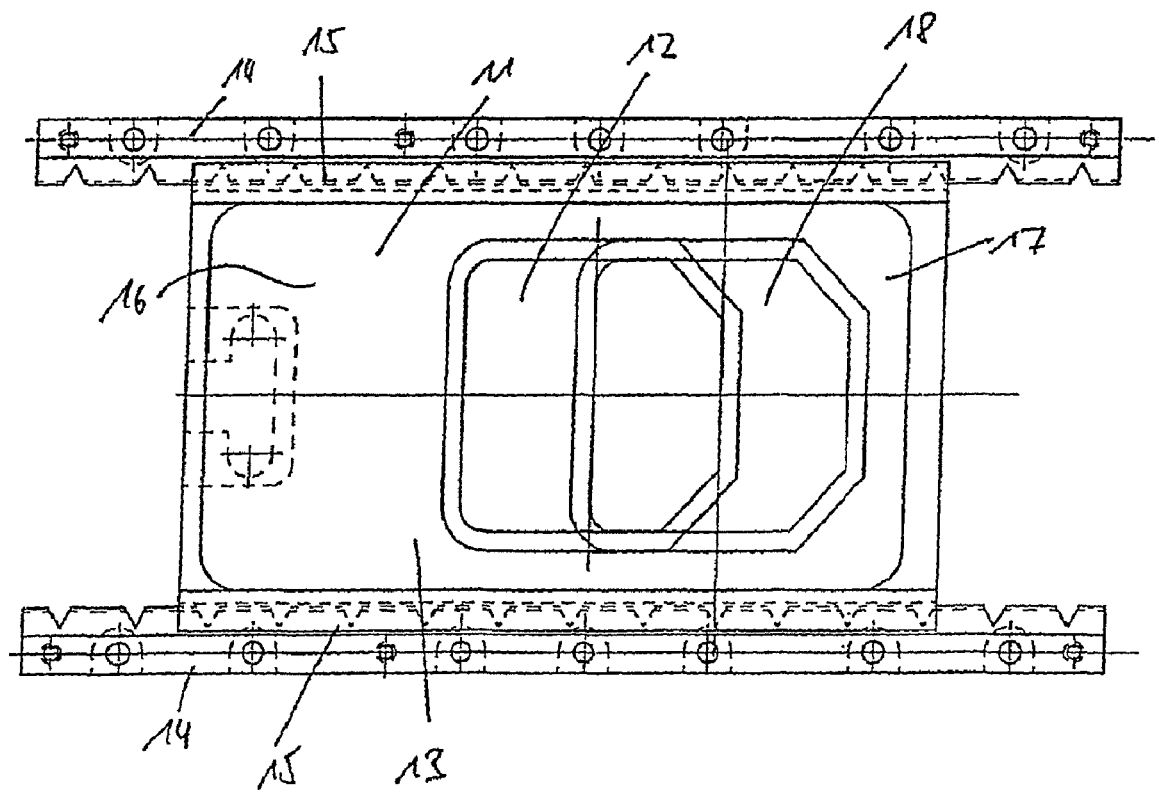

In this exemplary embodiment, wear protection is achieved by the slide plate's being lengthened in comparison with the slide plate known in FCC units. The slide plate 13 is specifically modified in comparison with the known slide plate so that there is provided not only a closure member 16 but also an opening member 17 arranged on the other side of the rod 23. The opening member 17 has a passage opening 18 (FIGS. 12, 20) which, in the open position II of the slide, is brought into correspondence with the restrictor aperture 12 (FIGS. 17, 18). Because the plate-associated guide rails 15 extend both in the region of the closure member 16 and in the region of the opening member 17, as shown in FIG. 20, the plate-associated guide rails 15 cover the pipe-associated guide rails 14 in the region of the restrictor aperture when the slide plate 13 has moved into the open position II. That means that the axial longitudinal extent of the plate-associated guide rails 15 is such that in the open position II of the slide plate 13 the plate-associated guide rails 15 cover the pipe-associated guide rails 14 substantially completely and accordingly protect them from contact with the abrasive flow of catalyst. This can be seen especially clearly in FIGS. 17, 18 and 22.

The pipe-associated guide rails 14 are therefore arranged so as to project into the flow cross-section of the pipe portion, without there being a risk that the guide rails 14 will become worn excessively quickly.

As shown in FIG. 20, the slide plate 13 is constructed with a wear-resistant material 25 which, on the side located at the top in the direction of flow, forms a sealing face which co-operates with the restrictor plate 19. As shown in cross-section in FIG. 21, the restrictor plate 19 is also provided with such a wear-resistant material.

Figure 21:
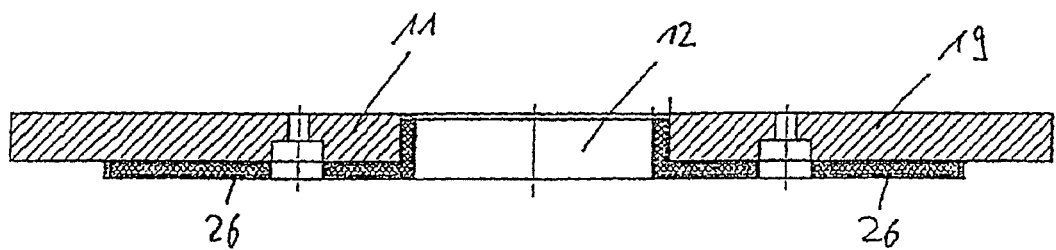
FIG. 21 shows, in cross-section and in plan view, the restrictor according to FIG. 3.
Figure 21:
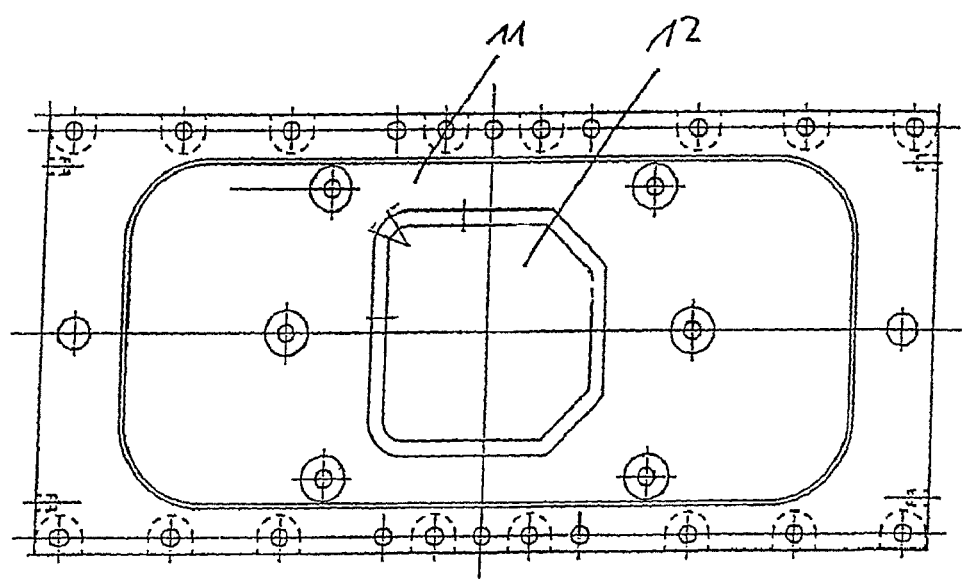

The length of the pipe-associated guide rail 14 is such that it extends on both sides beyond the region of the restrictor aperture 12 in the direction of movement of the slide plate 13, as can be seen in FIGS. 15 and 17. The length of the portion of the pipe-associated guide rails 14 that extends beyond the restrictor aperture 12 corresponds at least to the extent of the restrictor aperture 12 in the direction of movement of the slide plate 13. It is thus ensured that the slide plate 13 is guided laterally along its entire axial longitudinal extent when the slide plate 13 is moved into the open position II and into the closed position I. Likewise, the restrictor plate 19 also extends on both sides beyond the restrictor aperture 12 in the direction of movement of the slide plate 13 and at least corresponding to the extent of the restrictor aperture 12 in the direction of movement of the slide plate 13 (FIG. 21). The same applies to the wear-resistant material 26, which is mounted at the bottom on the restrictor plate 19 in the direction of flow and, together with the wear-resistant material 25 of the slide plate 13, forms a sealing face. Specifically, the longitudinal extent of the restrictor plate 19 in the direction of movement of the slide plate 13 is somewhat greater than the longitudinal extent of the wear-resistant material 26 on the underside of the restrictor plate 19, because it is sufficient for the wear-resistant material 26 on the underside of the restrictor plate 19 to be in contact with the corresponding wear-resistant material 25 of the slide plate 13, as shown for both positions I, II in FIG. 23.

Figure 23:
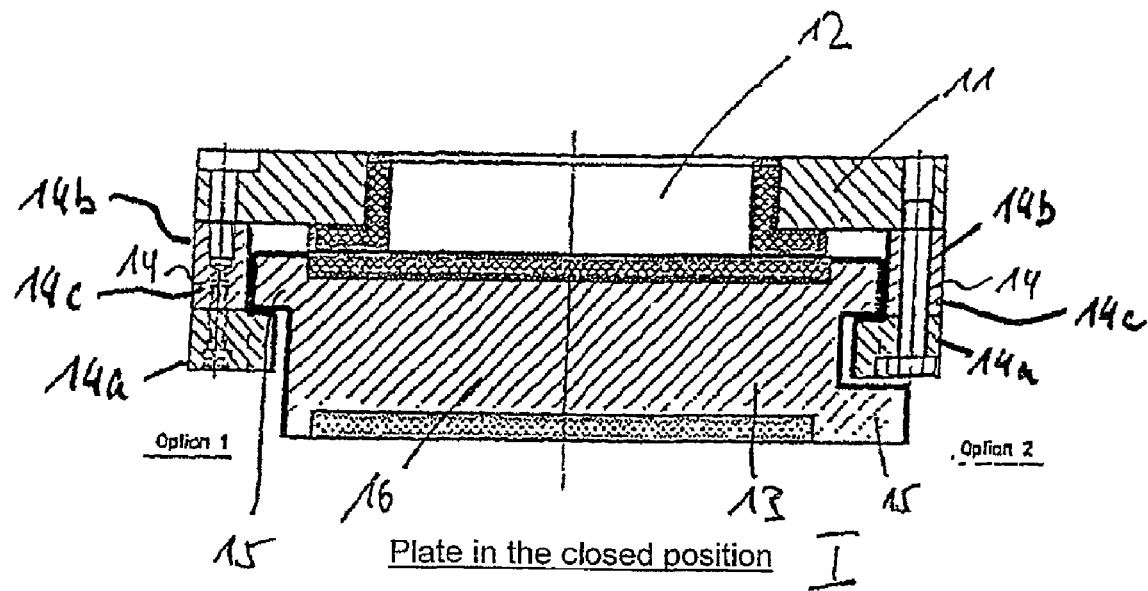
FIG. 23 shows a detail of the slide plate/restrictor arrangement according to FIG. 4 in the closed and open positions as well as with two different guide rails.
Figure 23:
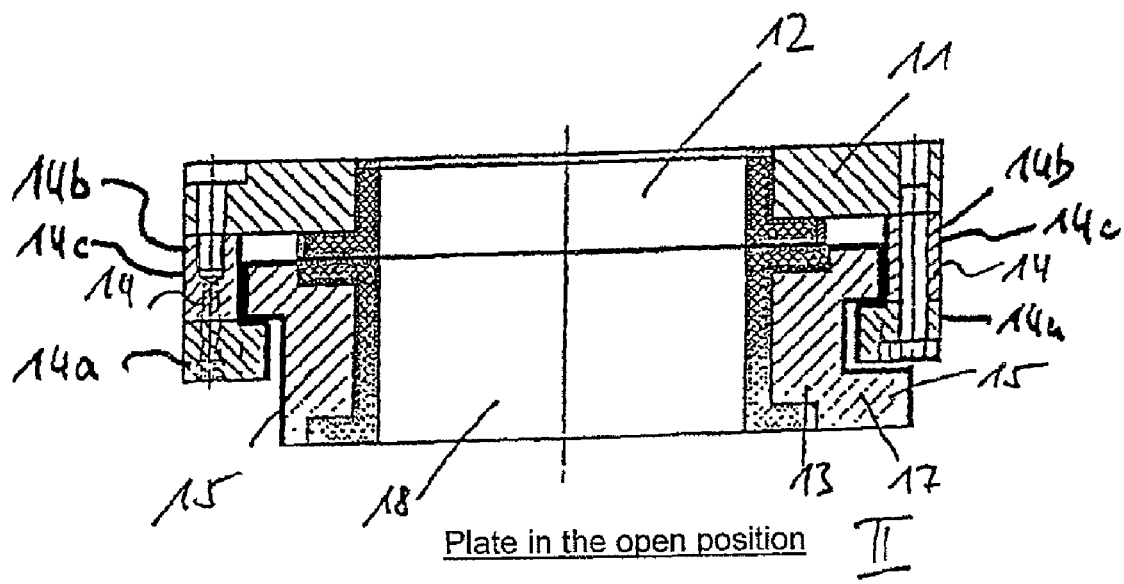

It can also be seen in FIG. 23 that the guide rails 14, 15 are formed as L-shaped profiles that engage in one another, the shorter horizontal limb of the plate-associated guide rail 15 resting on the pipe-associated guide rail 14 and protecting it from making contact with the corrosive medium. In addition, the longer vertical limb of the plate-associated guide rail covers an end face of the pipe-associated guide rail 14 that faces into the interior of the pipe, so that in this case too protection from making making contact with the abrasive medium is provided.

A further improvement in the wear-resistance of the unit is achieved when, as likewise shown in FIG. 23, the profile of the plate-associated guide rail 15 is U-shaped. The profile of the pipe-associated guide rail 14 is, furthermore, L-shaped, the horizontal limb of the L-shaped profile of the pipe-associated guide rail 14 being arranged between the two horizontal limbs of the plate-associated U-shaped profile. The pipe-associated guide rail 14 is thus also protected from the flow of catalyst from below in the direction of flow.

It is generally sufficient for the plate-associated guide rail 15 to project beyond the lower edge of the pipe-associated guide rail 14 in the direction of flow S, thus already achieving a considerable improvement in wear protection. The lower edge of the plate-associated guide rail 15 should, however, be at least level with the lower edge of the pipe-associated guide rail, although arrangements in which the lower edge of the plate-associated guide rail 15 is arranged slightly above the lower edge of the pipe-associated guide rail 14 in the direction of flow S can also be acceptable. A practicable region of overlap between the two guide rails 14, 15 begins with the arrangement of the lower edges of the two guide rails 14, 15 substantially at the same level. The region ends when the plate-associated guide rail 15 projects beyond the pipe-associated guide rail 14 in the direction of flow by approximately twice the length of the pipe-associated guide rail 14 in the direction of flow S. Higher overlap factors are technically possible.

Furthermore, it is generally the case that even better results in respect of resistance to wear are obtained when the pipe-associated guide rail 14 is covered on both sides, on the side facing the flow and on the side remote from the flow, for example by a U-shaped profile of the plate-shaped guide rail 15.

It can also be seen in FIG. 23 that the pipe-associated guide rails 14 can be of one-part or two-part construction. In the version (option 2) shown on the right-hand side in FIG. 23, the L-shaped guide rail 14 is screwed to the restrictor 11 at the upwardly facing end face of the vertical limb 14b. For that purpose, the vertical and horizontal limbs 14b, 14a are provided with through-bores which are aligned with corresponding threaded bores in the restrictor 11, so that the guide rail 14 can be screwed to the restrictor 11.

The guide rail 14 can be of two-part construction with separate horizontal and vertical limbs 14a, 14b or of one-part construction.

The pipe-associated guide rail 14 can also be of two-part construction, which is shown on the left-hand side of FIG. 23 (option 1). For that purpose, the horizontal limb 14a of the guide rail 14 is mounted on a perpendicular intermediate piece 14c so that the horizontal limb 14a and the perpendicular intermediate piece 14c form the perpendicular limb 14b of the L-shaped guide rail 14. The horizontal limb 14a and the intermediate piece 14c are screwed together from below, that is to say by way of the horizontal limb 14a. The connection of the two-part guide rail 14 to the restrictor 11 is effected separately from above, that is to say in the direction of flow S, the restrictor 11 being provided with a through-bore which is in alignment with a threaded bore in the intermediate part 14c or the perpendicular limb 14b of the guide rail 14. That exemplary embodiment has the advantage that there is no need to exchange the entire guide rail 14 for maintenance. Instead, it is sufficient for only the horizontal limb 14a to be removed and replaced.

Instead of the two-part configuration, the two guide rails according to FIG. 23 can be of single-stage construction.

The exemplary embodiments shown in FIG. 24 to 29 relate to further possible constructions of the track system comprising the pipe-associated and plate-associated guide rails 14, 15. The pipe-associated guide rails 14 can be of one-part construction or of multi-part construction, especially two-part or three-part construction, in the longitudinal direction.

Figure 24:
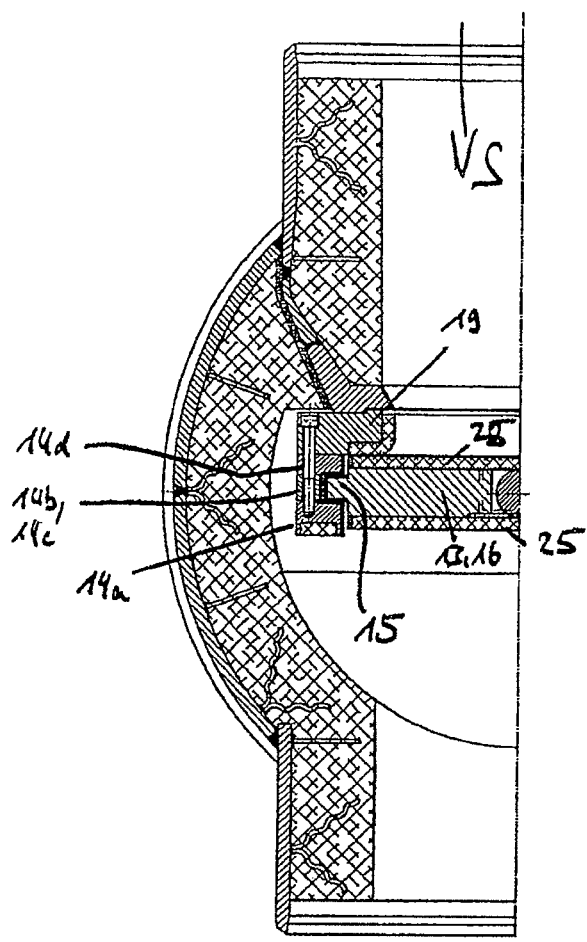
FIG. 24 is a cross-section through a track arrangement having a three-part pipe-associated guide rail.
Figure 25:
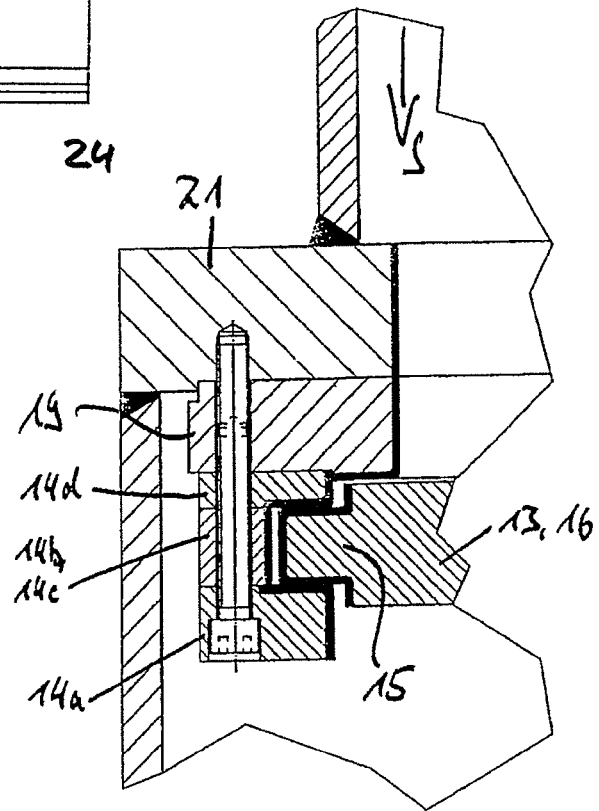
FIG. 25 is a cross-section through a three-part pipe-associated guide rail having a modified fixing means.
Figure 26:
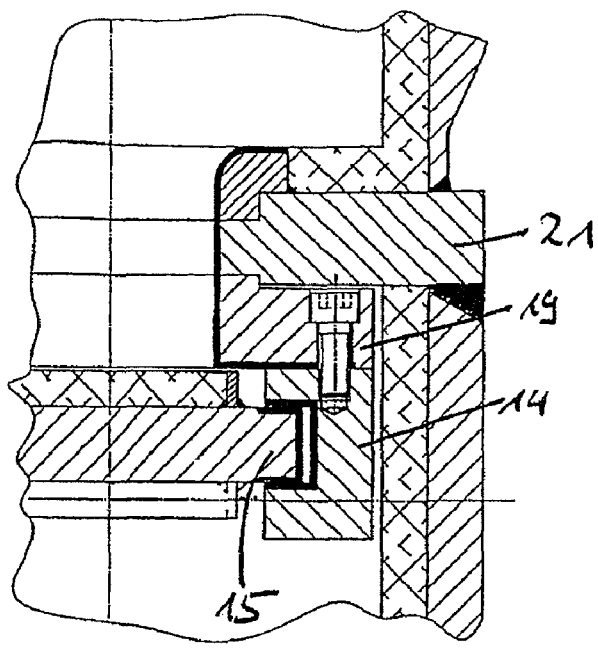
FIG. 26 is a cross-section through a one-part, U-shaped guide rail.

The exemplary embodiments according to FIG. 24, 25 relate to guide rails 14 of three-part construction, the pipe-associated guide rails 14 being of U-shaped cross-section similarly to the plate-associated guide rails 15 according to FIG. 23 (option 2). The U-shaped guide rails 14 are composed of a horizontal limb 14a, a perpendicular intermediate piece 14c and a further horizontal limb 14d, the two horizontal limbs 14a, 14d being spaced apart by the perpendicular intermediate piece 14c. As shown in FIG. 24, 25, the three-part guide rail 14 is U-shaped in cross-section. The plate-associated guide rail 15 has a shape that is substantially complementary to the pipe-associated guide rail 14, the plate-associated guide rail 15 being surrounded on both sides, that is to say at the top and bottom in the direction of flow, by the two horizontal limbs 14a, 14d. As a result, particularly secure guidance of the slide is achieved. The closure member 16 of the slide plate 13 shown in FIG. 24 is protected on both sides, that is to say at the top and bottom in the direction of flow S, by a wear-resistant material 25. Towards the bottom in the direction of flow S, the total thickness of the slide plate 13 achieved is therefore such that the plate-associated guide rail 15 almost completely covers the pipe-associated guide rail 14. In the exemplary embodiment according to FIG. 25, the protection provided by the wear-resistant material 25 is not shown.

Otherwise, the comparatively narrow construction of the slide plate 13 in the region of the closure member 16 according to claim FIG. 25 is not detrimental, because in the closed position shown in FIG. 25 there is no flow through the slide valve. Instead, in the region of the opening member 17 the covering for the pipe-associated guide rails 14 is provided by the plate-associated guide rails 15.

Without being limited thereto, the guide rails 14, 15 are constructed over their entire length in the same way as in the cross-sections according to FIGS. 24 to 29, except for FIG. 25.

The two exemplary embodiments according to FIG. 24, 25 differ from one another inter alia in the fixing of the pipe-associated guide rails 14. In the exemplary embodiment according to FIG. 24, the pipe-associated guide rail 14 is fixed from above in the direction of flow S, that is to say starting from the restrictor plate 19. For that purpose, aligned through-bores are provided in the restrictor plate 19, in the upper (in the direction of flow S) horizontal limb 14d and in the perpendicular intermediate piece 14c. A threaded bore, likewise arranged in alignment, is formed in the lower (in the direction of flow S) horizontal limb 14a, so that the three individual components 14a, 14c, 14d of the pipe-associated guide rail 14 can be screwed to the restrictor plate 19, as shown in FIG. 24.

In the exemplary embodiment according to FIG. 25, the pipe-associated guide rail 14 is screwed, from below, that is to say opposite to the direction of flow S, to the restrictor plate 19 and the connecting plate 21. For that purpose, through-bores are formed in the two horizontal limbs 14a, 14d as well as in the intermediate piece 14b and in the restrictor plate 19, which bores are in alignment with a threaded bore in the connecting plate 21. As a result, the individual components of the pipe-associated guide rail 14c can be screwed to the restrictor plate 19 and the connecting plate 21 from below. That exemplary embodiment has the advantage that the individual components of the pipe-associated guide rail 14 are simple to replace when required.

Instead of the multi-part, especially three-part, pipe-associated guide rail 14, a one-part pipe-associated guide rail 14 can also be used, as shown in FIG. 14. The one-part guide rail 14, which is U-shaped in cross-section, is fixed from above, that is to say by way of the restrictor plate 19.

Figure 27:
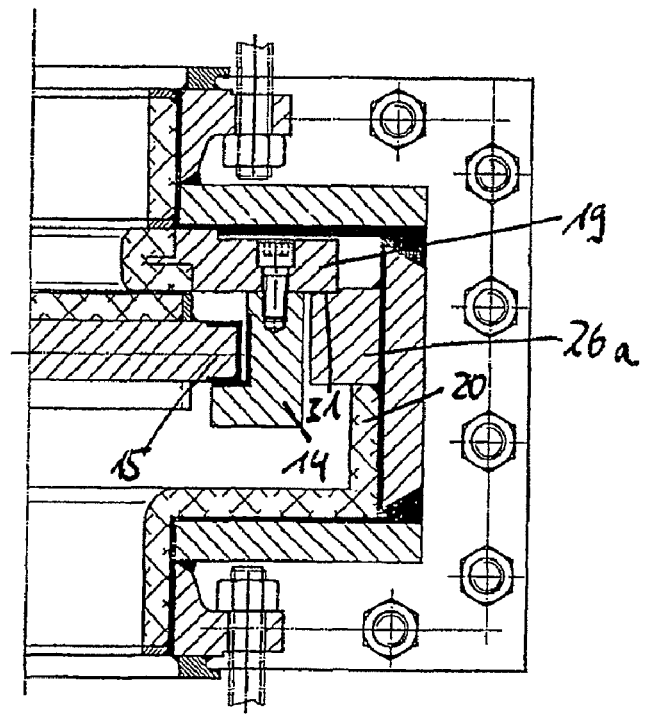
FIG. 27 is a cross-section through an exemplary embodiment having a holding means for the restrictor plate.

As shown in FIG. 27, the restrictor plate 19 can be mounted by means of a holding means 26a arranged laterally of the pipe-associated guide rail 14. The holding means 26a is seated on the refractory lining 20 and is welded to the housing. As can also be seen in FIG. 27, the restrictor plate 19 is seated in a recess 31 formed in the region of the front edge of the holding means 26*a*. The front edge of the holding means 26*a* corresponds to the free edge of the holding means 26*a* that faces the guide rail 14.

In the exemplary embodiment according to FIG. 27, the pipe-associated guide rail 14 is L-shaped in cross-section. It is also possible to use a U-shaped guide rail 14.

Figure 28:
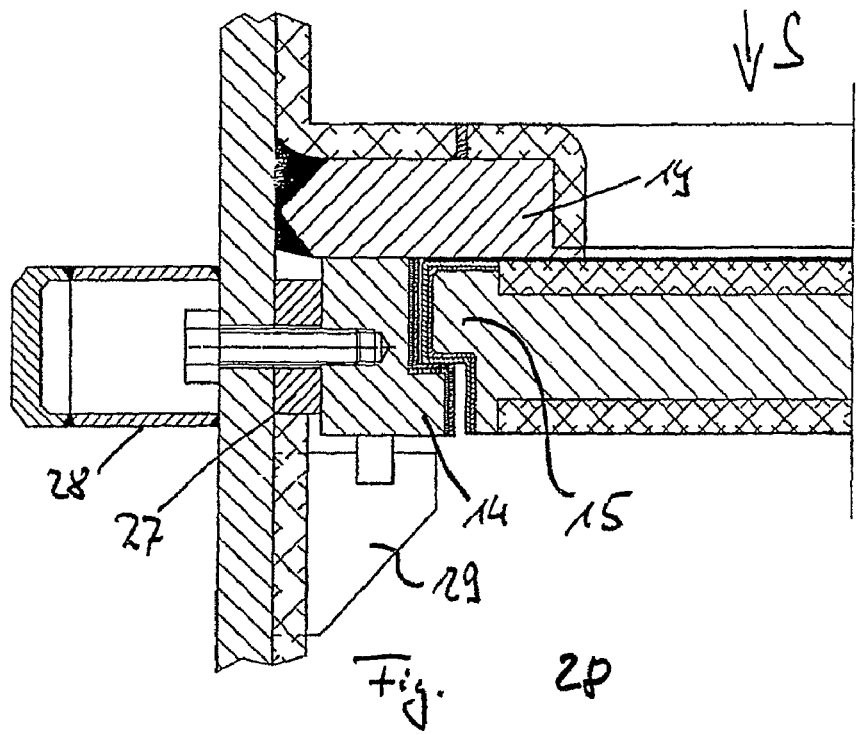
FIG. 28 is a cross-section through an exemplary embodiment having lateral fixing of the pipe-associated guide rail.

In the exemplary embodiment according to FIG. 28, the pipe-associated guide rail 14 is fixed, more specifically screwed, laterally to the housing of the slide valve. For that purpose, a spacer 27 is arranged between the guide rail 14 and the wall of the housing, which spacer 27 brings the guide rail 14 into the correct position. Outside the housing, the screw with which the guide rail 14 is fixed laterally is covered by a cover 28. Below the guide rail 14 in the direction of flow S there is also provided a support 29 which is joined to the wall of the housing. In this exemplary embodiment, the connection between the pipe-associated guide rail 14 and the restrictor plate 19 is omitted. The exemplary embodiment according to FIG. 28 is suitable both for the guide rail 14 of L-shaped cross-section shown in FIG. 28 and for guide rails 14 of U-shaped cross-section.

Figure 29:
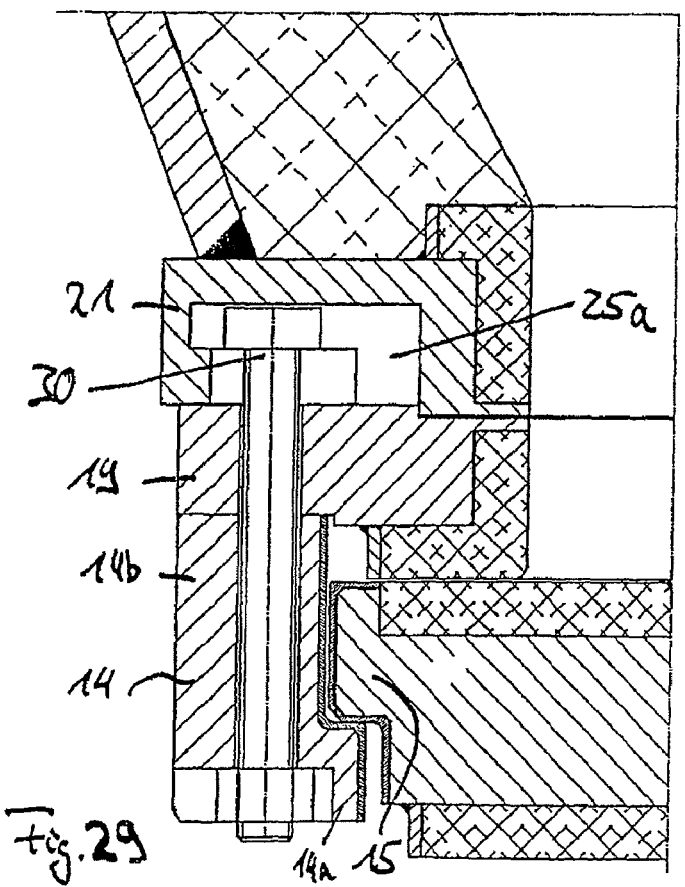
FIG. 29 is a cross-section through an exemplary embodiment in which a recess is provided in the connecting plate.

The exemplary embodiment shown in FIG. 29 is provided for perpendicular fixing of the pipe-associated guide rail 14, the connecting plate 21 being provided with a recess 25*a* which is arranged to receive a fixing means 30, especially a screw for joining the pipe-associated guide rail 14 to the connecting plate 21. Through-bores are formed in the pipe-associated guide rail 14 and in the restrictor plate 19, a nut being screwed onto the screw from below, which nut is countersunk into the horizontal limb 14*a*.

In a further exemplary embodiment (not shown), plate-associated guide rails are mounted on the side of the closure member remote from the rod 23 so that the plate-associated guide rails project beyond the closure member in the axial longitudinal direction. The length of the projecting region of the guide rails corresponds substantially to the length of the pipe-associated guide rails in the region of the restrictor aperture, with the result that the projecting region of the guide rails covers the pipe-associated guide rails in the region of the restrictor aperture when the slide plate has been moved into the open position. In that exemplary embodiment, the opening member having the passage opening is therefore omitted, thus creating a solution that is especially simple to implement.

All features disclosed in the exemplary embodiments, insofar as they are novel, are claimed alone or in combination.

LIST OF REFERENCE NUMERALS

10 pipe portion
11 restrictor
12 restrictor aperture
12*a* inlet opening
12*b* outlet opening
13 slide plate
14 pipe-associated guide element
14*a* horizontal limb
14*b* perpendicular limb
15 plate-associated guide element
16 trapezoidal limb
17 trapezoidal limb
18 passage opening
19 restrictor plate
19*a* forward face
19*b* rear face
19*c* side edge
19*d* recess
20 refractory material
21 connecting plate
22, 25, 26 wear-resistant material
23 rod
25*a* recess
26*a* holding means
27 spacer
28 cover
29 support
30 fixing means
31 recess

The invention claimed is:

1. A slide valve, configured to control a flowing media, comprising:
   a pipe portion;
   a restrictor positioned within the pipe portion, wherein the restrictor defines a restrictor aperture for controlling a flow therethrough during operation, the restrictor aperture having an inlet opening and an outlet opening; and
   a slide plate cooperating with the outlet opening to control the flow of media in a flow direction, the slide plate being movable between an open position and a closed position by a pipe portion-associated guide element positioned on the pipe portion and a slide plate-associated guide element positioned on the slide plate, the pipe portion-associated guide element and the slide plate-associated guide element being in engagement with each other,
   wherein:
      the pipe portion-associated guide element is configured so as to be protected from being impinged on by the media flow when the slide plate is in the open position; and
      a guide rail of the pipe portion-associated guide element is positioned before the outlet opening of the restrictor in the flow direction.

2. The slide valve according to claim 1 wherein the pipe portion-associated guide element is positioned outside the media flow.

3. The slide valve according to claim 1 wherein the pipe portion-associated guide element is positioned before the outlet opening in the flow direction.

4. The slide valve according to claim 1, wherein the restrictor includes a restrictor plate having a forward face and a rear face in the flow direction, the outlet opening being defined by the rear face of the restrictor plate.

5. The slide valve according to claim 4, wherein the pipe portion-associated guide element is at least one of positioned in the restrictor plate and positioned on the restrictor plate.

6. The slide valve according to claim 4, wherein the pipe portion-associated guide element is positioned about a side edge of the restrictor plate.

7. The slide valve according to claim 1, wherein the pipe portion-associated guide element is L-shaped in cross-section.

8. The slide valve according to claim 7, wherein a horizontal limb of the L-shaped guide element extends radially outwards with respect to the outlet opening.

9. The slide valve according to claim 7, wherein a horizontal limb of the L-shaped guide element extends radially inwards with respect to the outlet opening, and
   wherein the restrictor plate further defines a recess for receiving the slide plate-associated guide element, the recess being bounded radially outwards by the L-shaped guide element.

10. The slide valve according to claim 7, wherein the slide plate-associated guide element is inversely L-shaped in cross-section so as to be complementarily-configured with respect to the pipe portion-associated guide element.

11. The slide valve according to claim 4, wherein the pipe portion-associated guide element is provided in the rear face of the restrictor plate.

12. The slide valve according to claim 11, wherein the pipe portion-associated guide element comprises one of a dovetail guide configuration and a T-groove guide configuration.

13. The slide valve according to claim 4, wherein the pipe portion-associated guide element and the slide plate-associated guide element are positioned so as to have at least one of the pipe portion-associated guide element releasably joined to the restrictor plate and the slide plate-associated guide element releasably joined to the slide plate.

14. The slide valve according to claim 1, wherein at least the guide rail of the pipe portion-associated guide element is covered when the slide plate is in the open position.

15. The slide valve according to claim 1, wherein a guide rail of the slide-plate-associated guide element extends axially so as to substantially cover the guide rail of the pipe-portion-associated guide element, at least when the slide plate is in the open position.

16. The slide valve according to claim 15, wherein the slide valve is configured for use in Fluidized Catalytic Cracking units.

17. The slide valve according to claim 15, wherein the slide plate has a closure member configured such that, when the slide plate is in the closed position, the closure member blocks the restrictor aperture, and an opening member defining a passage opening configured such that, when the slide plate is in the open position, the opening member unblocks the restrictor aperture, and wherein the guide rail of the slide plate-associated guide element is associated with the closure member and the opening member at least along the axial extent of the passage opening.

18. The slide valve according to claim 14, wherein the guide rail of the pipe portion-associated guide element is configured to extend beyond the restrictor aperture in the direction of movement of the slide plate, at least to the extent of the restrictor aperture in the direction of movement of the slide plate.

19. The slide valve according to claim 18, wherein the guide rail of the pipe-portion-associated guide element is configured to extend in opposite directions beyond the restrictor aperture, at least to the extent of the restrictor aperture in the direction of movement of the slide plate.

20. The slide valve according to claim 15, wherein the restrictor includes a restrictor plate defining the restrictor aperture, the restrictor plate extending in opposite directions beyond the restrictor aperture in the direction of movement of the slide plate, at least to the extent of the restrictor aperture in the direction of movement of the slide plate.

21. The slide valve according to claim 15, wherein at least one of the guide rail of the slide plate associated guide element and the guide rail of the pipe portion-associated guide element has an L-shaped profile in cross-section.

22. The slide valve according to claim 15, wherein the guide rail of the slide plate-associated guide element has, in cross-section, a U-shaped profile configured to extend about a top and a bottom of the corresponding guide rail of the pipe portion-associated guide element in the direction of flow.

23. The slide valve according to claim 15 wherein the guide rail of the pipe portion-associated guide element includes at least two axially-positioned components.

24. The slide valve according to claim 15, wherein the guide rail of the pipe portion-associated guide element is U-shaped in cross-section.

25. The slide valve according to claim 24, wherein the guide rail of the pipe portion-associated guide element comprises a horizontal limb, an intermediate piece positioned perpendicularly thereto and a further horizontal limb arranged in a U-shape, wherein the horizontal limb, the further horizontal limb and the intermediate piece are releasably joined together.

26. The slide valve according to claim 15, further comprising a holding device positioned laterally adjacent to the guide rail of the pipe portion-associated guide element, and configured to support the restrictor plate.

27. The slide valve according to claim 15, wherein the guide rail of the pipe portion-associated guide element is fixed laterally to a housing of the slide valve.

28. The slide valve according to claim 15, further comprising a connecting plate defining a recess for receiving a fixing mechanism for joining the guide rail of the pipe portion-associated guide element to the connecting plate.

29. The slide valve according to claim 15, further comprising a closure member, wherein the guide rail of the slide plate-associated guide element is disposed about the closure member and projects axially beyond the closure member so that a projecting portion of the guide rail of the slide plate-associated guide element substantially covers the guide rail of the pipe portion-associated guide element about the restrictor aperture.

\* \* \* \* \*